US012563052B1

(12) United States Patent
Bakthavatchalam et al.

(10) Patent No.: US 12,563,052 B1
(45) Date of Patent: Feb. 24, 2026

(54) REAL-TIME REGULAR EXPRESSION SEARCH ENGINE

(71) Applicant: Redberry Systems, Inc., Los Altos Hills, CA (US)

(72) Inventors: Madhavan Bakthavatchalam, Fremont, CA (US); Varadarajan Srinivasan, Los Altos Hills, CA (US); Sandeep Khanna, Los Altos, CA (US)

(73) Assignee: Redberry Systems, Inc., Los Altos Hills, CA (US)

( * ) Notice: Subject to any disclaimer, the term of this patent is extended or adjusted under 35 U.S.C. 154(b) by 396 days.

(21) Appl. No.: 17/987,033

(22) Filed: Nov. 15, 2022

Related U.S. Application Data

(63) Continuation of application No. 16/014,351, filed on Jun. 21, 2018, now Pat. No. 11,516,227, which is a
(Continued)

(51) Int. Cl.
| | |
|---|---|
| *H04L 9/40* | (2022.01) |
| *G06F 7/02* | (2006.01) |
(Continued)

(52) U.S. Cl.
CPC ............ *H04L 63/1416* (2013.01); *G06F 7/02* (2013.01); *G06F 21/564* (2013.01); *H04L 45/74591* (2022.05)

(58) Field of Classification Search
CPC ........... H04L 63/1416; H04L 45/74591; G06F 21/564; G06F 7/02
See application file for complete search history.

(56) References Cited

U.S. PATENT DOCUMENTS

| | | |
|---|---|---|
| 6,952,425 B1 | 10/2005 | Nelson |
| 7,440,304 B1 | 10/2008 | Raj |
(Continued)

OTHER PUBLICATIONS

Pao, Derek; Wang, Xing; Wang, Xiaoran; Cao, Cong; Zhu, Yuesheng; "String Searching Engine for Virus Scanning," IEEE Transactions on Computers, Nov. 2011, vol. 60, No. 11, pp. 1596-1609.*
(Continued)

*Primary Examiner* — Victor Lesniewski
(74) *Attorney, Agent, or Firm* — Charles Shemwell

(57) ABSTRACT

In a malware detection device, first characters in a network traffic flow are compared with a plurality of entries within a ternary content addressable memory (TCAM), the plurality of entries including a first entry that constitutes a first segment of a malware signature. In response to an output from the first TCAM indicating that the first characters match the first entry, a variable-character expression engine determines whether second characters in the network traffic flow match a first variable-length regular expression, the variable-length regular expression corresponding to a second segment of the malware signature. A comparand value is generated that includes third characters in the network traffic flow and an expression-match value that indicates whether the second characters match the first variable-length regular expression. The TCAM compares the first comparand value with the plurality of entries therein as part of a determination whether the network traffic flow contains the malware signature.

20 Claims, 17 Drawing Sheets

Malware Signatures (Rules)

Input Data Stream

Related U.S. Application Data continuation of application No. 15/832,727, filed on Dec. 5, 2017, now Pat. No. 10,033,750.

(51) Int. Cl.
 *G06F 21/56* (2013.01)
 *H04L 45/745* (2022.01)

(56) References Cited

U.S. PATENT DOCUMENTS

| | | | |
|---|---|---|---|
| 7,613,755 B1 | 11/2009 | Venkatachary | |
| 7,643,353 B1 | 1/2010 | Srinivasan et al. | |
| 7,656,716 B1 | 2/2010 | Srinivasan et al. | |
| 7,660,140 B1 | 2/2010 | Joshi et al. | |
| 7,802,303 B1 | 9/2010 | Zhao et al. | |
| 7,821,844 B2 | 10/2010 | Srinivasan et al. | |
| 7,826,242 B2 | 11/2010 | Joshi et al. | |
| 7,853,578 B1 | 12/2010 | Anker et al. | |
| 7,876,590 B2 | 1/2011 | Joshi et al. | |
| 7,881,125 B2 | 2/2011 | Srinivasan et al. | |
| 7,907,432 B2 | 3/2011 | Deshpande et al. | |
| 7,916,510 B1 | 3/2011 | Starovoitov et al. | |
| 7,924,589 B1 | 4/2011 | Srinivasan et al. | |
| 7,924,590 B1 | 4/2011 | Starovoitov et al. | |
| 8,023,300 B1 | 9/2011 | Srinivasan et al. | |
| 8,023,301 B1 | 9/2011 | Srinivasan et al. | |
| 8,031,503 B1 | 10/2011 | Gyllenhammer et al. | |
| 8,111,533 B2 | 2/2012 | Gyllenhammer et al. | |
| 8,166,536 B1 | 4/2012 | Ammundi et al. | |
| 8,369,121 B2 | 2/2013 | Gyllenhammer et al. | |
| 9,870,502 B2 | 1/2018 | Szabo et al. | |
| 9,941,008 B1 | 4/2018 | Wu et al. | |
| 9,967,272 B1 | 5/2018 | Khanna et al. | |
| 10,033,750 B1 | 7/2018 | Bakthavatchalam et al. | |
| 2003/0004688 A1 | 1/2003 | Gupta et al. | |
| 2004/0100950 A1 | 5/2004 | Basu et al. | |
| 2004/0174820 A1 | 9/2004 | Ricciulli | |
| 2004/0215593 A1 | 10/2004 | Sharangpani et al. | |
| 2005/0111460 A1 | 5/2005 | Sahita | |
| 2005/0125687 A1 | 6/2005 | Townsend et al. | |
| 2005/0132342 A1 | 6/2005 | Van Lunteren | |
| 2005/0216770 A1 | 9/2005 | Rowett et al. | |
| 2005/0238022 A1 | 10/2005 | Panigrahy | |
| 2006/0015654 A1 | 1/2006 | Krantz et al. | |
| 2006/0020595 A1 | 1/2006 | Norton et al. | |
| 2006/0085389 A1 | 4/2006 | Flanagan et al. | |
| 2006/0095588 A1 | 5/2006 | Van Lunteren | |
| 2007/0094441 A1* | 4/2007 | Kim | G11C 15/00 |
| | | | 711/108 |
| 2007/0115986 A1 | 5/2007 | Shankara | |
| 2008/0046423 A1 | 2/2008 | Alicherry et al. | |
| 2008/0050469 A1 | 2/2008 | Kwon et al. | |
| 2008/0071781 A1 | 3/2008 | Ninan et al. | |
| 2008/0111716 A1 | 5/2008 | Artan et al. | |
| 2008/0133583 A1 | 6/2008 | Artan et al. | |
| 2008/0140662 A1 | 6/2008 | Pandya | |
| 2010/0131935 A1 | 5/2010 | Wang | |
| 2011/0029549 A1 | 2/2011 | Pandya | |
| 2011/0030057 A1 | 2/2011 | Chen et al. | |
| 2011/0038375 A1 | 2/2011 | Liu et al. | |
| 2011/0145181 A1 | 6/2011 | Pandya | |
| 2011/0154495 A1* | 6/2011 | Stranne | G06F 21/564 |
| | | | 706/13 |
| 2011/0167030 A1* | 7/2011 | Bremler-Barr | G06N 5/01 |
| | | | 706/48 |
| 2011/0302656 A1* | 12/2011 | El-Moussa | H04L 63/1416 |
| | | | 726/24 |
| 2012/0072380 A1 | 3/2012 | Liu et al. | |
| 2013/0136011 A1 | 5/2013 | Tardo et al. | |
| 2013/0160125 A1* | 6/2013 | Likhachev | G06F 21/564 |
| | | | 726/24 |
| 2014/0003436 A1 | 1/2014 | Wang | |
| 2014/0006706 A1 | 1/2014 | Wang | |
| 2014/0082176 A1* | 3/2014 | Basso | G06F 16/90339 |
| | | | 709/224 |
| 2014/0269307 A1 | 9/2014 | Banerjee et al. | |
| 2014/0298039 A1 | 10/2014 | Pandya | |
| 2015/0096024 A1* | 4/2015 | Haq | H04L 63/1416 |
| | | | 726/23 |
| 2015/0295807 A1 | 10/2015 | Huang et al. | |
| 2015/0347753 A1* | 12/2015 | Tuvell | G06F 21/563 |
| | | | 726/24 |
| 2016/0028766 A1 | 1/2016 | Valgenti et al. | |
| 2016/0070818 A1* | 3/2016 | Billa | G06F 16/245 |
| | | | 707/798 |
| 2016/0088001 A1 | 3/2016 | Yeh et al. | |
| 2016/0094572 A1* | 3/2016 | Tyagi | G06F 21/562 |
| | | | 726/23 |
| 2016/0283316 A1 | 9/2016 | Abali et al. | |
| 2016/0283317 A1 | 9/2016 | Abali et al. | |
| 2016/0337400 A1 | 11/2016 | Gupta | |
| 2017/0048116 A1 | 2/2017 | Anderson | |
| 2017/0208037 A1* | 7/2017 | Hay | H04L 63/0245 |
| 2018/0046689 A1 | 2/2018 | Yoshinaga | |
| 2018/0083770 A1* | 3/2018 | Zhai | G06F 21/563 |
| 2018/0198809 A1* | 7/2018 | Kushwaha | G06F 21/564 |
| 2019/0327163 A1* | 10/2019 | Johnsen | H04L 45/74591 |

OTHER PUBLICATIONS

"PERL—Regular Expressions," available for download at least prior to Dec. 5, 2017 from https://www.tutorialspoint.com/perl/, pp. 1-20, tutorialspoint.com.

"Perl 5 version 26.1 documentation," available for download at least prior to Dec. 5, 2017 from https://perldoc.perl.org/perlre.html, pp. 1-36, PERL.ORG.

Christiansen, Tom et al., "Programming PERL, Fourth Edition," Feb. 2012, pp. 43-46, 202-206, 214-217, 221-229, 231, 232 and 247-251, O'Reilly Media, Inc., Sebastopol, CA.

Friedl, Jeffrey E. F., "Mastering Regular Expressions, Second Edition," Jul. 2002, pp. 9-14, 17-20, 32, 59-67, 112, 113 and 135-140, O'Reilly & Associates, Inc., Sebastopol, CA.

Huang, Kun; Ding, Linxuan; Xie, Gaogang; Zhang, Dafang; Liu, Alex X.; Salamatian, Kave; "Scalable TCAM-based Regular Expression Matching with Compressed Finite Automata", ACM/IEEE Symposium on Architectures for Networking and Communications Systems (ANCS), Oct. 2-21, 2013, pp. 83-93.

Lin et al., "Hardware-Software Codesign for High-Speed Signature-Based Virus Scanning," IEEE Computer Society, IEEE, Sep./Oct. 2009, pp. 56-65.

Or et al., "Memory-Based Hardware Architectures to Detect ClamAV Virus Signatures with Restricted Regular Expression Features," IEEE Transactions on Computers, IEEE USA, vol. 65, No. 4, Apr. 2016, pp. 1225-1238.

Pao et al., "A memory-based NFA regular expression match engine for signature-based intrusion detection," Computer Communications 36 (2013), Elsevier, Mar. 15, 2013, pp. 1255-1267.

United States Patent and Trademark Office, Non-Final Office Action in U.S. Appl. No. 15/832,727, filed Feb. 23, 2018, 29 pages.

Van Lunteren et al., "Hardware-Accelerated Regular Expression Matching at Multiple Tens of GB/s," Proceedings IEEE Infocom, IEEE, 2012, pp. 1737-1745.

Van Lunteren, "High-performance Pattern-Matching for Intrusion Detection," Proceedings IEEE Infocom, IEEE, 2006, 13 pages.

Wall, Larry et al., "Programming PERL, Third Edition," Jul. 2000, pp. 158-161, 165-167, 176, 182, 183 and 187, O'Reilly Media, Inc., Sebastopol, CA.

Wang et al., "Hardware Accelerator to Detect Multi-Segment Virus Patterns," Computer Journal, Section D: Security In Computer Systems and Networks, vol. 58, No. 10, Aug. 22, 2014, pp. 2443-2460.

Wu, Chih-Chiang; Wen, Sung-Hua; Huang, Nen-Fu; Kao, Chia-Nan; "A Pattern Matching Coprocessor for Deep and Large Signature Set in Network Security System", IEEE Global Telecommunications Conference, Nov. 28-Dec. 2, 2005, 5 pages.

Xu, Yang; Liu, Zhaobo; Zhang, Zhuoyuan; Chao, H. Jonathan; "High-Throughput and Memory-Efficient Multimatch Packet Clas-

(56)        References Cited

OTHER PUBLICATIONS sification Based on Distributed and Pipelined Hash Tables", IEEE/
ACM Transactions on Networking, vol. 22, Issue 3, Jul. 22, 2013,
pp. 982-995.
Yu et al., "Gigabit Rate Packet Pattern-Matching Using TCAM,"
IEEE, Proceeding of the 12th IEEE International Conference on
Network Protocols (ICNP'04) in Berlin, Germany, Oct. 2004, 10
pages.

* cited by examiner

FIG. 1

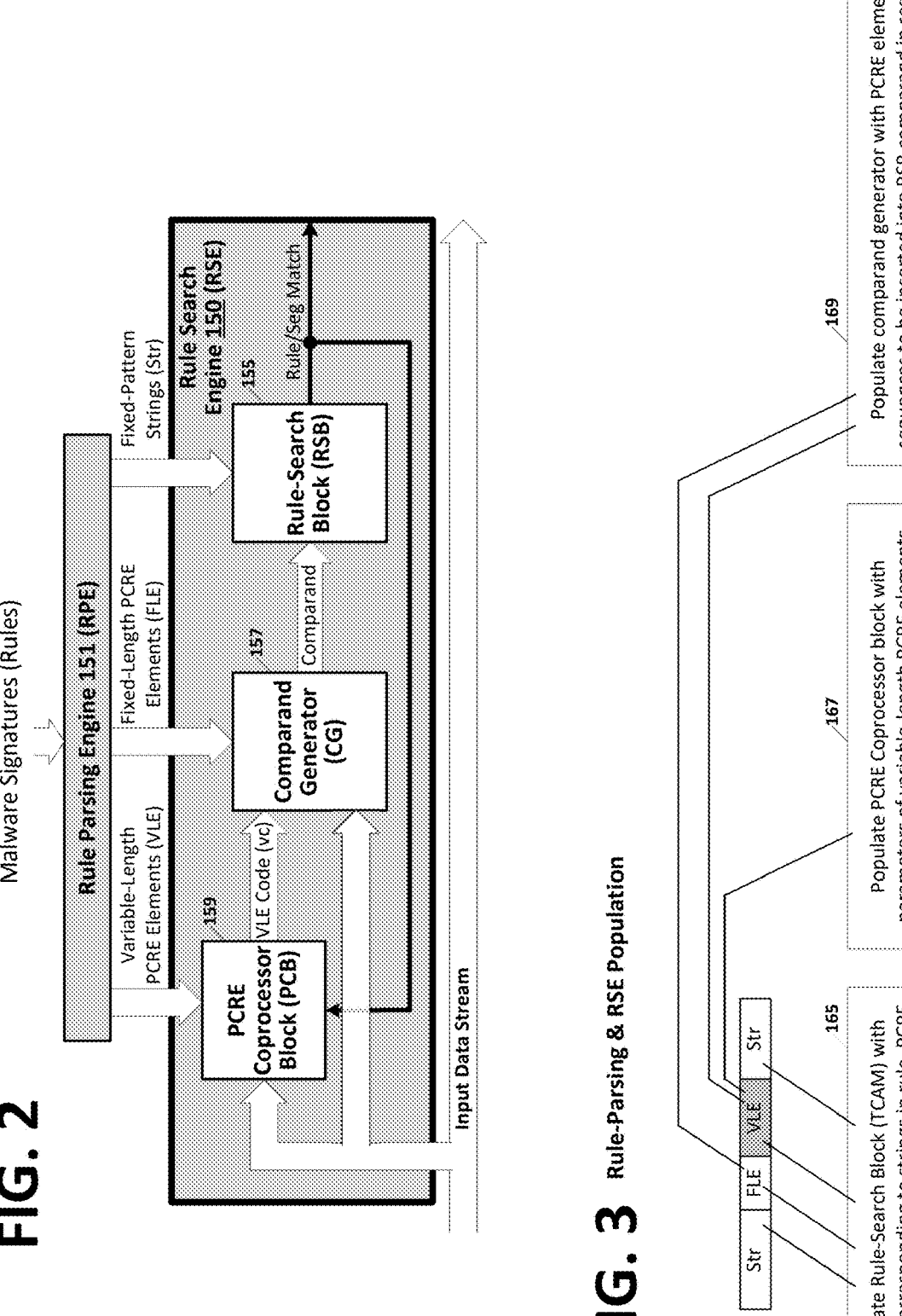

FIG. 2

Malware Signatures (Rules)

Rule Parsing Engine 151 (RPE)

Variable-Length PCRE Elements (VLE)

Fixed-Length PCRE Elements (FLE)

Fixed-Pattern Strings (Str)

Rule Search Engine 150 (RSE)

PCRE Coprocessor Block (PCB)
159

VLE Code (vc)

Comparand Generator (CG)
157

Comparand

Rule-Search Block (RSB)
155

Rule/Seg Match

Input Data Stream

FIG. 3   Rule-Parsing & RSE Population

Rule | Str | FLE | VLE | Str |

Populate Rule-Search Block (TCAM) with strings corresponding to strings in rule, PCRE-element bit sequences, and rule/segment ID values to be output upon TCAM match
165

Populate PCRE Coprocessor block with parameters of variable-length PCRE elements (VLEs) and match-codes to be output upon detection of respective VPEs within input stream
167

Populate comparand generator with PCRE element bit sequences to be inserted into RSB comparand in response to (i) input stream characters or character strings that match fixed-length PCRE elements (FLEs) and (ii) VLE match codes
169

VLE-Segmented
Rule Search

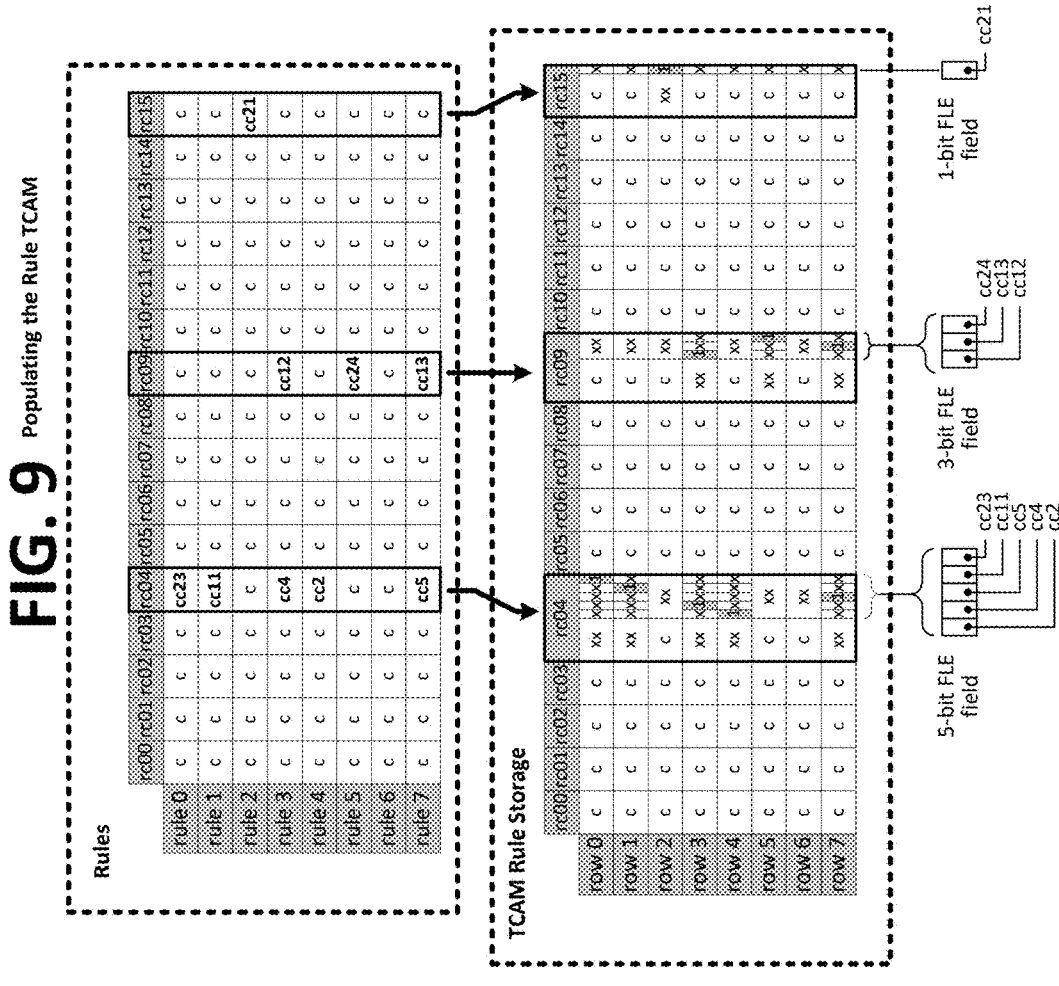
FIG. 9   Populating the Rule TCAM
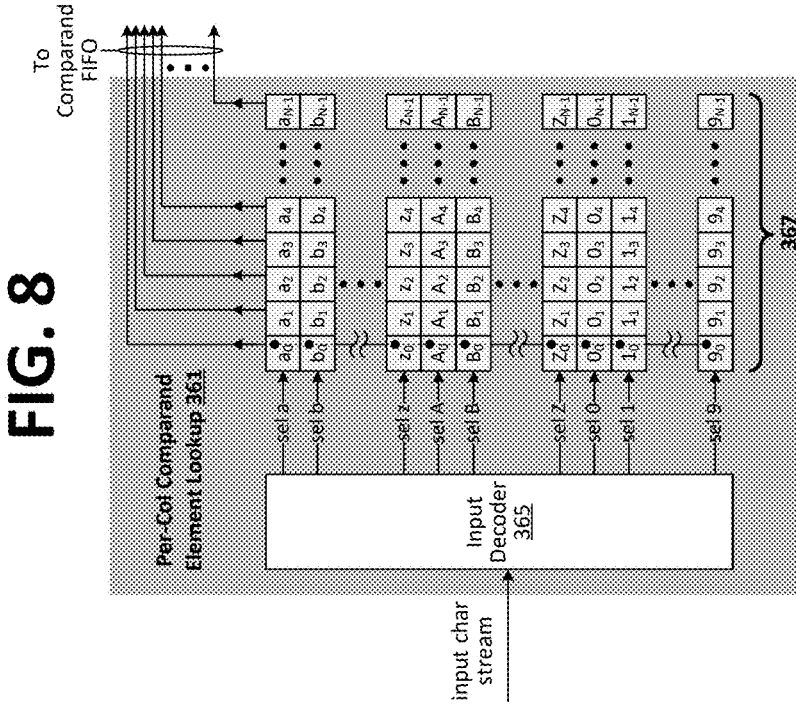
FIG. 8

FIG. 10

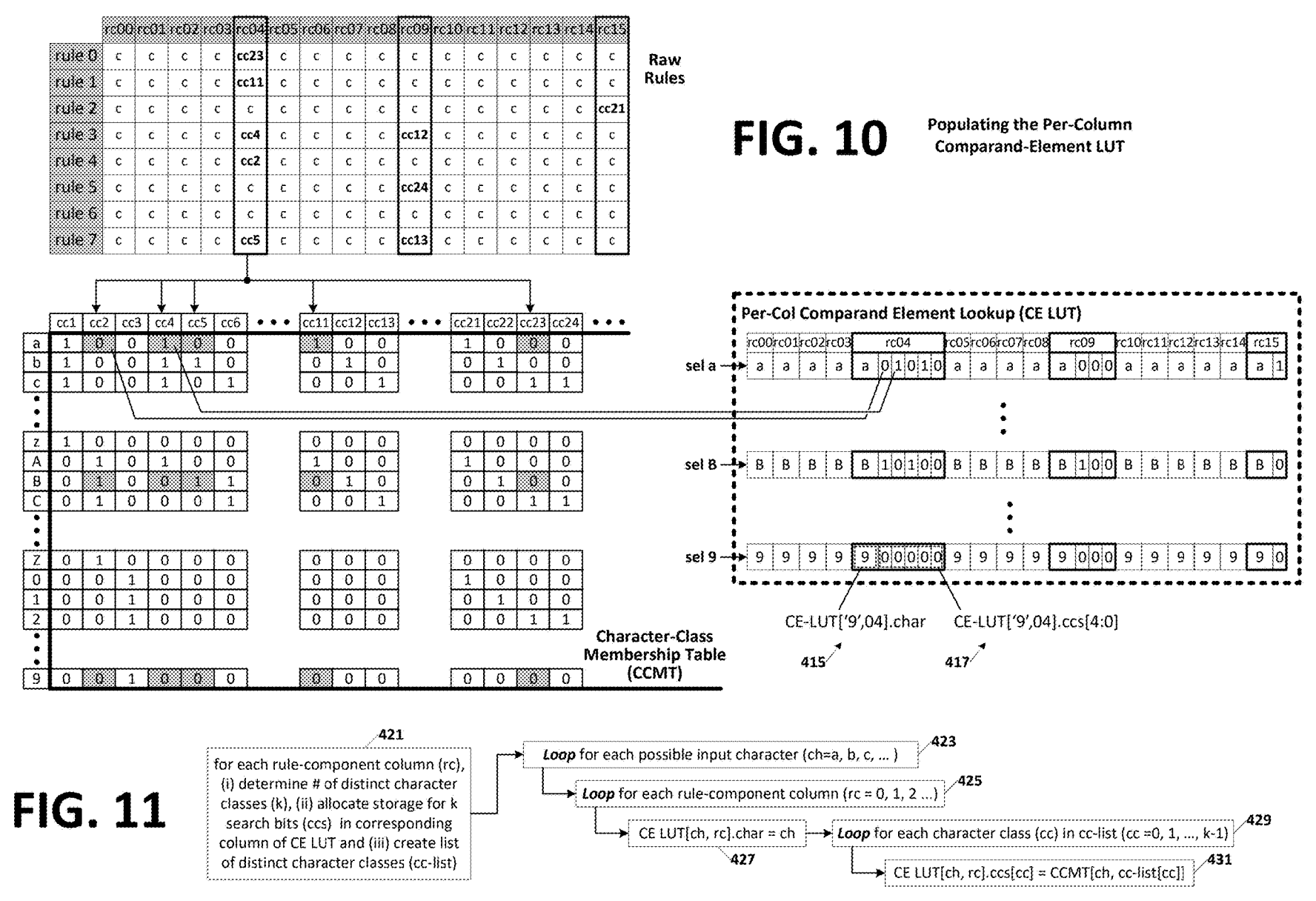

Populating the Per-Column
Comparand-Element LUT

Per-Col Comparand Element Lookup (CE LUT)

CE-LUT['9',04].char

CE-LUT['9',04].ccs[4:0]

417

415

FIG. 11 for each rule-component column (rc),
(i) determine # of distinct character
classes (k), (ii) allocate storage for k
search bits (ccs)  in corresponding
column of CE LUT and (iii) create list
of distinct character classes (cc-list)

421

*Loop* for each possible input character (ch=a, b, c, ... )

423

*Loop* for each rule-component column (rc = 0, 1, 2 ...)

425

CE LUT[ch, rc].char = ch

427

*Loop* for each character class (cc) in cc-list (cc =0, 1, ..., k-1)

429

CE LUT[ch, rc].ccs[cc] = CCMT[ch, cc-list[cc]]

431

Character-Class
Membership Table
(CCMT)

Raw
Rules

Comparand Progression

TCAM Rule Storage
Alternatives

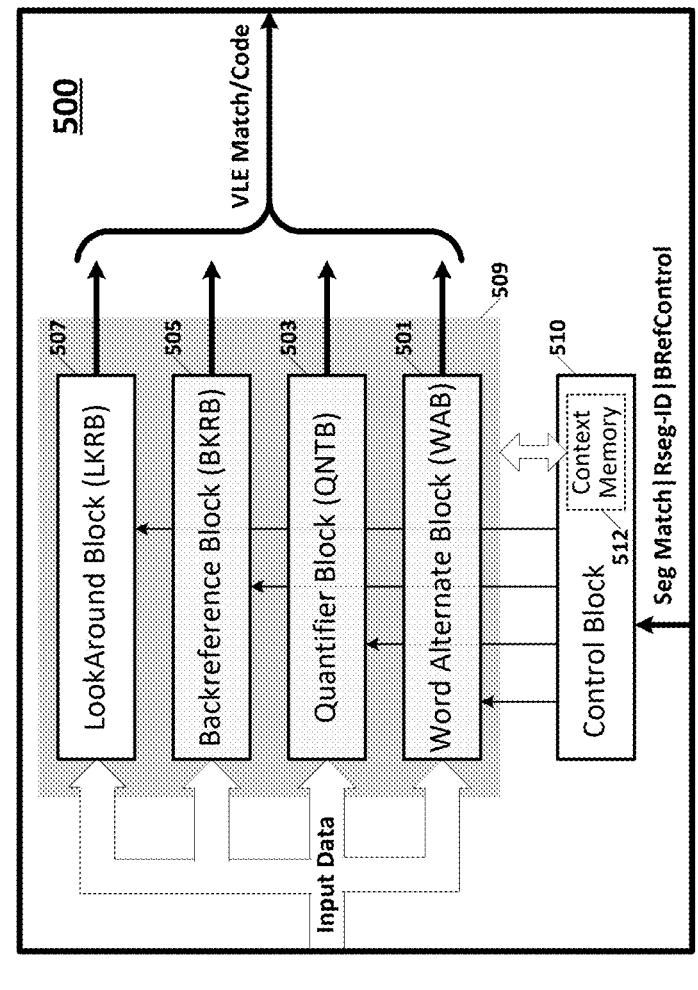
FIG. 13    PCRE Coprocessor Block (PCB)

FIG. 15    Rule-Set Reduction – Reducing to Elemental Quantifiers

FIG. 22
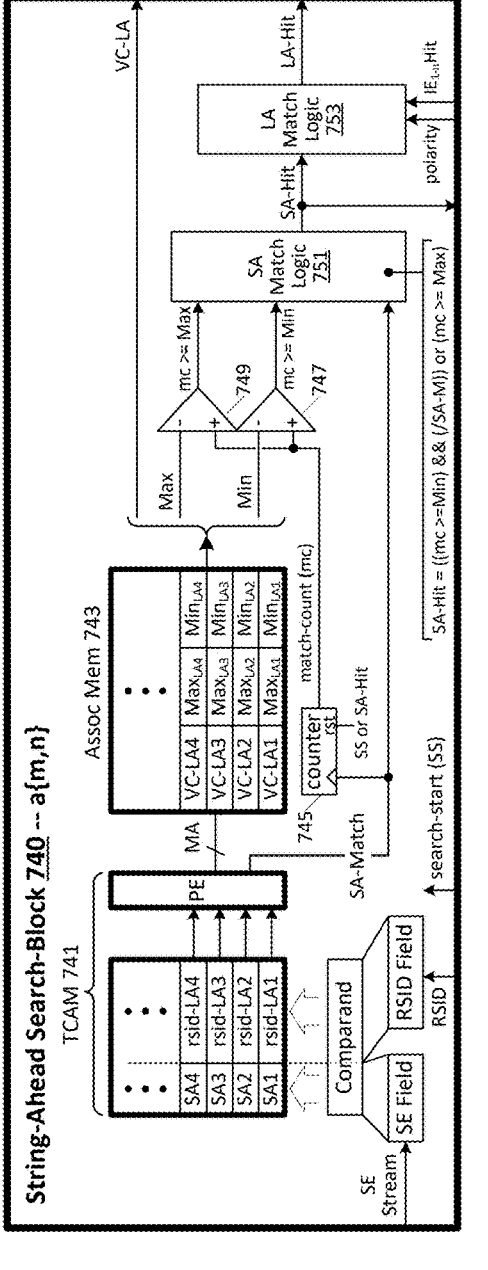
FIG. 23
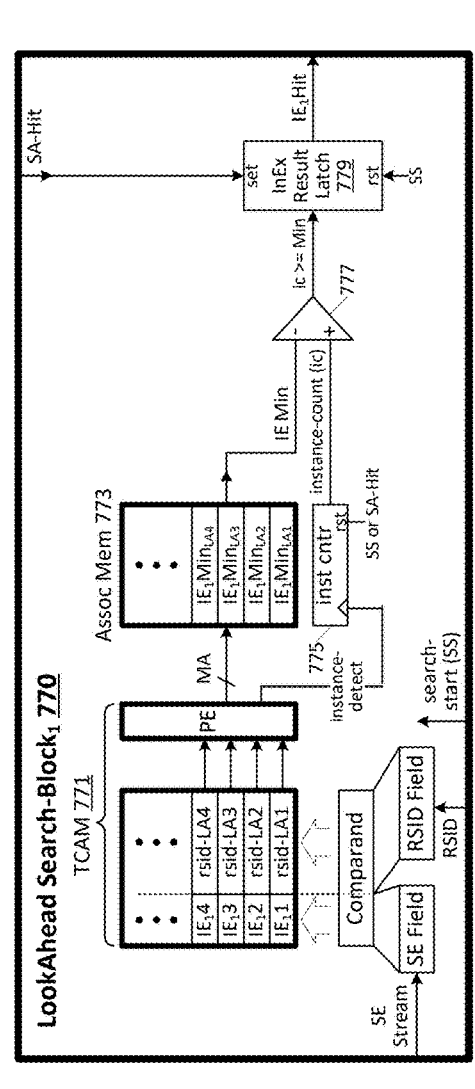
FIG. 21

REAL-TIME REGULAR EXPRESSION SEARCH ENGINE

TECHNICAL FIELD

The present disclosure relates to network security.

BACKGROUND

The proliferation and ever-increasing sophistication of malware in its various forms—viruses, worms, advanced persistent threat (APT), distributed-denial-of-service (DDoS) attack or any other code or traffic that represents an actual or potential security threat—has traditionally been countered by software-based detection schemes that favor tractability over execution speed. As network data rates escalate, however, the malware detection bottleneck is becoming increasingly problematic, constraining network performance particularly in high-throughput enterprise networks.

DRAWINGS

The various embodiments disclosed herein are illustrated by way of example, and not by way of limitation, in the figures of the accompanying drawings and in which like reference numerals refer to similar elements and in which:

FIG. 1 illustrates an embodiment of a network security device that executes line-rate malware detection with respect to packetized network traffic;

FIG. 2 illustrates an embodiment of a rule search engine that may be used to implement the more generalized rule search engine shown in FIG. 1;

FIG. 3 illustrates a generalized operation of a rule-parsing engine in view of an exemplary malware signature (rule) having a pair of strings and fixed-length and variable-length elements formatted as PERL-compatible regular expressions ("PCRE elements");

FIG. 8 illustrates an embodiment of a per-column comparand lookup table that may be used to implement the comparand lookup of FIG. 7;

FIG. 9 illustrates a TCAM rule storage example that guides population of the FIG. 8 comparand lookup table;

FIG. 10 illustrates an exemplary approach to populating the per-column lookup table of FIG. 8 that carries forward the rule-set example of FIG. 9 as well as the bitfield/character-class correspondence;

FIG. 11 illustrates an exemplary approach to loading the per-column comparand element lookup table of FIG. 10;

FIG. 13 illustrates a more detailed embodiment of a PCRE coprocessor block that may be used to implement the PCRE coprocessor blocks shown in FIGS. 2 and 4;

FIG. 21 illustrates a lookaround search block that may be used to implement the lookaround blocks shown in FIGS. 2 and 4;

FIG. 22 illustrates an embodiment of a string-ahead search block that may be deployed as the string-ahead search block shown in FIG. 21; and FIG. 23 illustrates an embodiment of a lookahead search block that may be used to implement lookahead search block shown in FIG. 21

DETAILED DESCRIPTION

Figure 4:
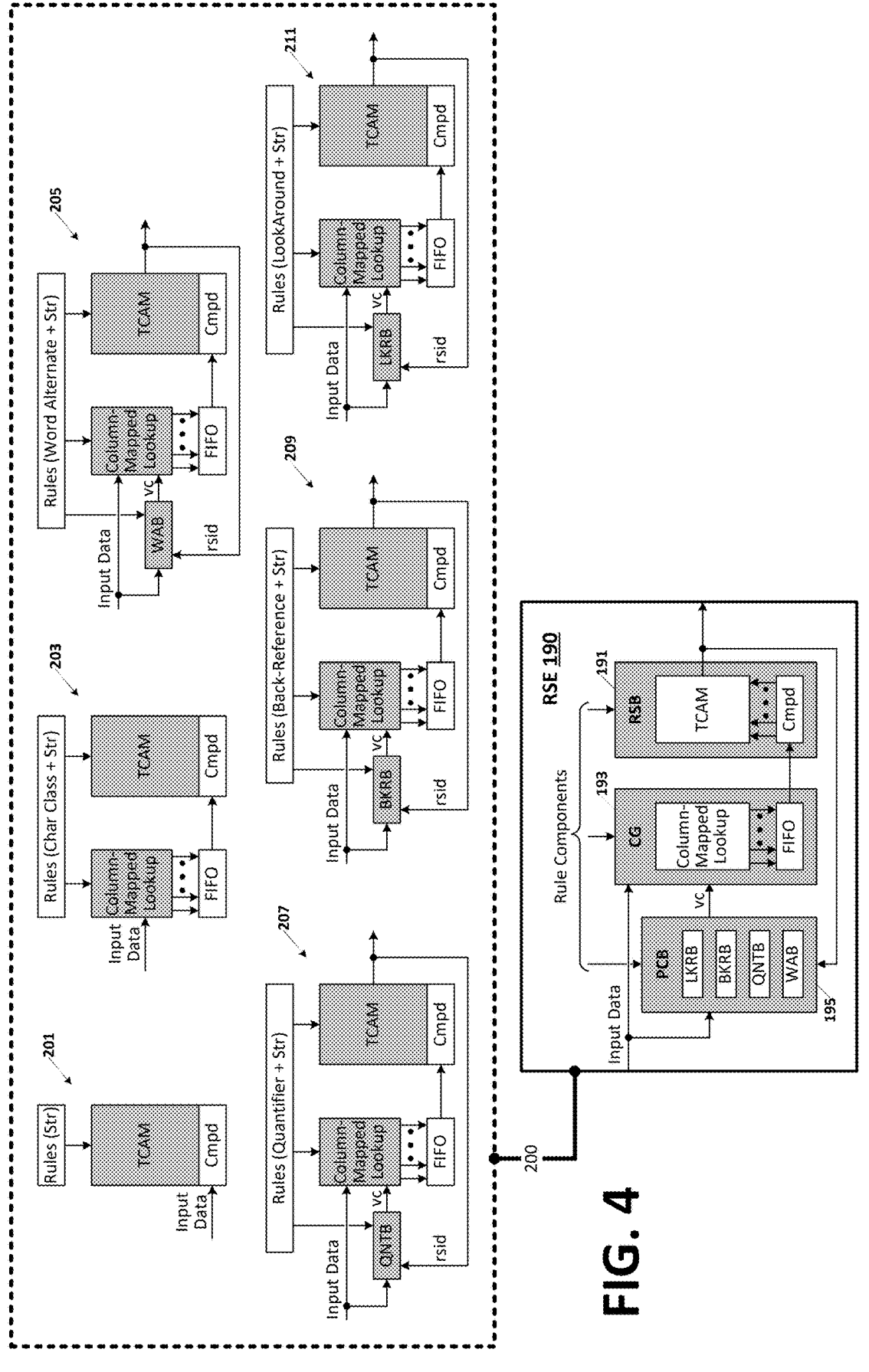
FIG. 4 illustrates an embodiment of a rule-search engine showing additional detail with respect to component search units within a PCRE coprocessor block as well as a generalized search flow with respect to rules having different component elements.

In various embodiments disclosed herein, a signature detection engine parses malware signatures or "rules" into respective collections of rule segments that include strings and variable expressions, storing the constituent strings of each rule in a ternary content addressable memory (TCAM) together with bitfields corresponding to the variable expressions. A variable-expression search engine and comparand generator cooperate to generate insert variable-expression match bits into the incoming data stream at locations corresponding to the bitfield storage within the TCAM, forming a rule-formatted comparand value having string fields and bitfields corresponding to those of the rule storage within the TCAM. Accordingly, as the input data stream progresses character by character through the signature detection engine in successive TCAM search cycles, corresponding rule-formatted comparand instances are generated—one comparand instance per search cycle—and compared with the TCAM storage to ascertain rule match detection. The per-search-cycle comparison of each comparand instance to the entirety of the TCAM storage effects a highly-parallel and therefore extremely rapid malware detection at the nominal data rate of the input media (e.g., at "line rate" and thus in real-time), avoiding the detection bottlenecks that plague conventional software-based approaches.

Figure 1:
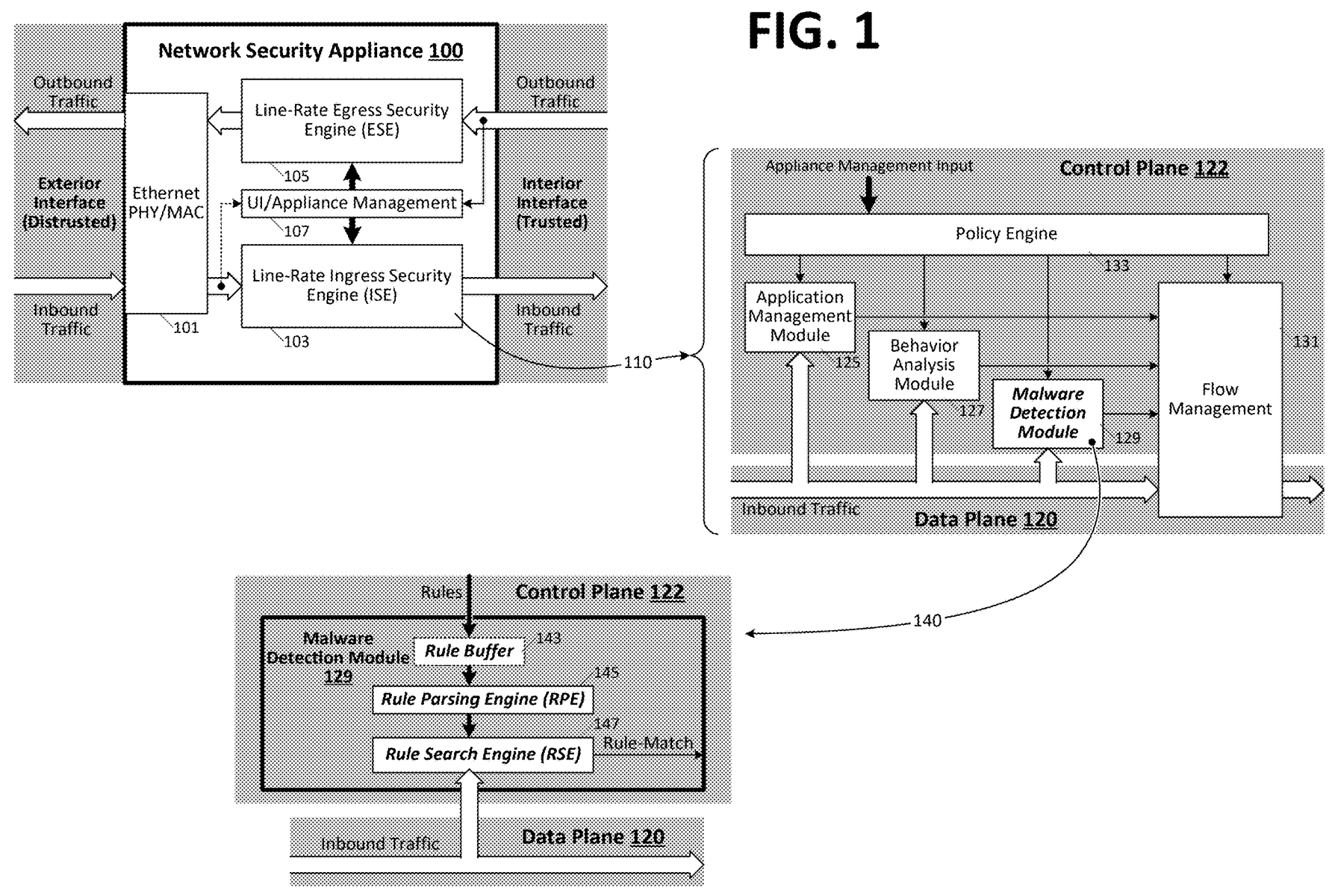

FIG. 1 illustrates an embodiment of a network security appliance or device 100 that executes line-rate malware detection with respect to packetized network traffic flowing between an interface to a distrusted exterior network ("exterior interface"—e.g., Internet interface) and an interface to a nominally trusted interior network ("interior interface"). While appliance 100 (which may constitute or be part of a firewall and/or carry out various other network functions such as traffic switching/routing, access control, deduplication, accounting, etc.) is depicted as having an Ethernet-based exterior interface (implementing at least physical (PHY) and media-access control (MAC) layers of the Ethernet stack as shown at 101) and a more generalized interior interface, various alternative or more specific network interfaces may be used on either or both sides of the appliance, including proprietary interfaces where necessary. Also, while separate (split) inbound and outbound traffic paths are shown, a single bidirectional path may be implemented with respect to either or both of the exterior and interior interfaces.

At its core, network security appliance 100 implements a pair of line-rate security engines 103 and 105, each coupled to a user-interface/appliance-management module 107. In the split-traffic embodiment shown, line-rate security engine 105 executes security and control operations with respect to traffic egressing from the interior network to the exterior network (i.e., outbound traffic) and is thus referred to as an "egress security engine" (ESE), while line-rate security engine 103 executes security and control operations with respect to traffic ingressing from the exterior network to the interior network (i.e., inbound traffic) and is referred to accordingly herein as an "ingress security engine" (ISE). While the ingress and egress security engines generally implement asymmetric security and control functions (due, for example, to disparate trust in the respective networks from which they receive traffic), both security engines may carry out the same or similar operations with respect to traffic flows and/or contain same or similar architectural components. Accordingly, while various security and control structures and operations discussed with respect to embodiments below focus on traffic inbound from the distrusted exterior network and thus security architectures within ingress security engine 103, in all cases such structures and operations may be implemented within egress security engine 105 to provide security/control with respect to outbound traffic. Also, though shown and described as separate security engines, the ingress and egress security engines may be merged into a single security engine that executes security/control actions with respect to inbound and/or outbound traffic, particularly in implementations that manage traffic over a bidirectional path between either or both of the exterior and interior interfaces.

FIG. 1 also depicts an exemplary detail-view (110) of ingress security engine 103 and its general organization into a data plane 120 through which packetized network traffic flows (preferably but not necessarily at line rate) and a control plane 122 that carries out control and management operations with respect to the network traffic. As shown, control plane 122 includes a policy engine 133, application management module 125, behavior analysis module 127 and malware detection module 129, the latter being the particular focus of various embodiments discussed below. Control plane 122 and data plane 120 jointly contribute to traffic flow management within a flow management unit 131 and, though not specifically shown, data plane 120 may additionally include one or more buffers to queue or otherwise store traffic supplied to control plane modules 125, 127 and 129 and/or flow management unit 131. Control plane 122 may also include various other components to manage flow detection and tracking (e.g., organizing incoming packets with respect to logical flows and/or notifying other control-plane components of flow-switch events) and bandwidth allocation.

In general, policy engine 133 enables application-tailored operation within ingress security engine 103, applying input from user-interface/appliance-management unit 107 (e.g., user input received via a dedicated user interface and/or included within traffic from the trusted network or, with appropriate safeguards, from the exterior network) to control operation within control plane modules 125, 127, 129 and flow management unit 131. In the case of malware detection module 129, for example, policy engine 133 may supply (with or without processing) malware signatures or "rules"—continuous or disjointed strings of symbols that correspond to known malware implementations—that are to be detected within inbound traffic and reported to flow management unit 131. As discussed below, flow management unit 131 may take various actions with respect to reported malware detections, including blocking malware-infested traffic flows and/or seizing information with respect to such flows to enable forensic or other advanced security measures.

FIG. 1 also shows a more detailed embodiment (140) of malware detection module 129 that includes a rule buffer 143, rule parsing engine 145 and a hardware-accelerated rule search engine 147. As shown, rule buffer 145 receives rules from a source within control plane 122 (e.g., policy engine 133 of FIG. 1) and forwards or otherwise makes those rules available to rule search engine 147. Rule search engine 147 additionally receives inbound traffic from the data plane 120 and asserts a rule-match signal ("Rule-Match") to notify downstream functional blocks (e.g., flow management 131 unit) of a malware detection event upon confirming a match between a rule (malware signature) and contents of the inbound traffic.

Still referring to FIG. 1, while inbound traffic is delivered to malware detection module 129 at line-rate (i.e., according to network bandwidth) and in real-time (i.e., as the traffic arrives), rule delivery and other control plane operations (e.g., configuration operations, etc.) may occur at slower rates and/or during times of relatively low traffic or even zero traffic (e.g., where run-time operation of the host network security appliance is suspended for maintenance or other down-time). Moreover, rules may be delivered alternatively as a full set of replacement rules (e.g., delivering a completely new database or library of rules) and/or as occasional updates to a previously delivered or accumulated rule database. Accordingly, depending on the rule delivery rate and/or rule format (update vs. complete database), temporary storage of rules prior to parsing within rule parsing engine 145 and/or loading into rule search engine 155 may be unnecessary, making buffer 143 an optional feature as indicated by its depiction in dashed outline (a drawing convention used generally herein, though features shown without dashed line or dashed outline may also be optional unless explicitly stated otherwise).

FIG. 2 illustrates embodiments of a rule search engine embodiment 150 (RSE) and rule parsing engine 151 (RPE) that may be used to implement RSE 147 and RPE 145 of FIG. 1. As shown, rule search engine 150 includes a rule search block 155 (RSB), comparand generator 157 (CG) and Perl-Compatible Regular-Expression (PCRE) coprocessor block 159 (PCB), with those three components coupled to receive fixed-pattern strings, fixed-length PCRE elements (FLE) and variable-length PCRE rule elements (VLE) from rule parsing engine 151. In one embodiment rule-search block is implemented at least in part by a ternary content addressable memory in which fixed-pattern-string constituents of malware signatures are stored and parallel-searched. While variable expressions within the rules—fixed-length and variable-length PCRE elements—may also be represented and searched to a limited extent within the ternary CAM (e.g., through bit masking and/or solution of a single rule containing a variable expression into two or more rules having fixed-length elements corresponding to possible expression variants), searches for variable-expression rule components are predominantly carried out within the PCRE coprocessor block and comparand generator, with the results of those searches combined with raw input data (from input data stream) to form the comparand applied within rule-search block. In a number of embodiments, for example, bit-fields representative of variable expressions are strategically allocated within the ternary CAM (within RSB 155) at particular column locations that correspond to locations of those expressions within a given rule. PCRE coprocessor block (PCB) and comparand generator 157 determine whether the variable expressions are matched by character (s) at correct offsets (position windows) within the input stream, setting or clearing bits within the CAM comparand (i.e., at column offsets that correspond to the bitfield columns within the CAM) accordingly to ensure a CAM-search hit or miss with respect to the variable expressions simultaneously with confirmation of match/mismatch with respect to fixed-pattern string components of the same rule.

FIG. 3 illustrates a generalized operation of rule-parsing engine 151 of FIG. 2 in view of an exemplary malware signature (rule) having a pair of strings and fixed-length and variable-length elements formatted as PERL-compatible regular expressions ("PCRE elements"). As shown at 165, the parsing engine populates the ternary CAM within rule-search block with strings corresponding to the strings in the rule, and also populates the ternary CAM with PCRE element bit sequences (i.e., bitfields interleaved between string elements according to locations of PCRE elements within the rule) and rule and rule-segment identifier values (rule ID, rule-segment ID) to be output upon detecting a CAM match. At 167, the rule-parsing engine populates the PCRE coprocessor block with parameters of variable-length PCRE elements (VLEs) and match-codes to be output from the PCRE coprocessor block upon detection of those VLEs within the input data stream. Referring to 169, rule parsing engine populates the comparand generator with PCRE element bit sequences to be inserted into the RSB comparand in response to (i) input characters or character strings that match fixed-length PCRE elements (FLEs), and (ii) match codes output from the PCRE coprocessor block in response to detection of input stream character(s) that match variable-length expressions (VLEs) recorded in the PCRE coprocessor block.

FIG. 4 illustrates an embodiment of a rule-search engine 190 architected generally as described above, but showing additional detail with respect to component search units within the PCRE coprocessor block 195 as well as a generalized search flow with respect to rules having different component elements. As discussed above, rule-search block 191 includes a ternary CAM ("TCAM") and comparand buffer ("Cmpd"), with the latter (which may be included as part of the TCAM) being loaded with search data from comparand generator 193. Comparand generator 193 includes a column-mapped lookup table that yields, for each input character, a column-specific set of search values to be compared with respective rule-component columns with in the TCAM. As shown, the column-specific search values are loaded into a first-in-first-out (FIFO) buffer element which serializes column-specific values corresponding to respective input characters—an operation discussed in greater detail below.

Continuing with FIG. 4, the PCRE coprocessor block 195 includes a number of specialized search blocks dedicated to identifying respective types of variable-length PCRE elements within the input stream, including a word-alternate block (WAB), quantifier block (QNTB), back-reference block (BKRB) and look-around block (LKRB). In general, word-alternate block performs specialized searching for alternative character strings (referred to herein as "words") that may appear at a given instance within a rule. Where the alternate words are identical in length, the word-alternate expression is reduced to a fixed-length PCRE element (FLE) that may be identified within the column-mapped lookup table of comparand generator 193. Where at least one of the alternate words is longer/shorter than others, the word-alternate expression constitutes a variable-length PCRE element—an element that renders the length of the overall rule-matching string longer or shorter according to which of the alternate words it contains. As with variable-length quantifiers (regular expression representative of variable number of instances of a character or character class), back-references (regular expression indicating a repeated instance of a variable-length string within the input data stream) and lookaround expressions (logical qualifiers of variable expressions), the length variability of the word alternate expression complicates static positioning of remaining rule segments (fixed-length variable expressions and strings) within the TCAM; a complication overcome by operation of the PCRE coprocessor block and comparand generator.

Examples of search sequences with respect to rules having various different string/FLE/VLE components are depicted conceptually at 200 in FIG. 4. A rule expressed entirely by a deterministic character string, for example, may be stored in its entirety within the TCAM component of rule search block 191 (RSB) and thereafter searched for each successive character string loaded into the TCAM comparand buffer (i.e., each such comparand reflecting a per-character shift of the input data stream through the comparand buffer). This operation is shown generally at 201. For rules limited to a combination of deterministic strings and character classes (e.g., as shown at 203), the column-mapped lookup table within comparand generator 193 performs a lookup operation with respect to the input stream character corresponding to the character-class location within the rule, signaling character class membership (hit) or non-membership (miss) by setting/clearing a bitfield appended to the comparand field used to store the input character itself, thus enabling TCAM to simultaneously compare (i) the input stream character with corresponding character fields in rules that lack the character class expression and (ii) the bitfield (containing a '1' or '0') indicative of character class membership with the expected '1' in the TCAM entry containing the character-class-laden rule. In effect, the lookup operation within the comparand generator constitutes a class membership search, with the lookup-result recorded as a hit/miss determination within the comparand at an offset corresponding to the relative location of the character class expression within the rule. By this operation, affirmative class membership determination within the comparand generator (i.e., character class "hit") enables an affirmative rule-match determination within RSB 191 (i.e., within the TCAM therein) according to whether the string components of the rule are found within (matched by contents of) the input data stream. Conversely, a character-class miss ensures that no rule-match will be signaled by the TCAM (i.e., bitfield in comparand will be '0' and thus will not match the corresponding '1' bit in the rule entry) regardless of whether remaining strings of the rule match.

Still referring to the rule examples in FIG. 4, an exemplary search for a rule having a word-alternate and one or more strings is depicted at 205. As explained in greater detail below, searches for rules containing word-alternates and/or other variable-length expressions are executed in multiple search phases corresponding to respective segments of the rule. The "rule segments" themselves are generally defined by the location of variable-length expressions in the rule, and search phases are carried out cooperatively in the TCAM and relevant search unit of the PCRE coprocessor block. In the case of the word-alternate-laden rule shown at 205, for example, an initial search for a rule segment constituted by a string that precedes the word-alternate expression is executed within the RSB, with a string match resulting in a transmission of a rule segment ID ("rsid") to the word-alternate block (WAB) to enable search for one of the specific set of alternate words specified by the rule. Upon detecting the matching word at the expected offset within the input data stream (i.e., a "search window" that spans a portion of the input data stream immediately following the initially matched string), the word-alternate block issues a match-detect signal to the comparand generator together with a VLE-code (VC) that corresponds to the matched expression. The comparand generator responds to the word-alternate match signal and VC by setting a VLE-match bit within the outgoing comparand at a location corresponding to a bitfield reserved within the TCAM for the word-alternate expression, effectively pre-pending (or appending) the VLE-match bit to ensuing comparand content. Accordingly, assuming that the remainder of the rule is a deterministic string, then a match between the string remainder and input data stream will be supplemented by a match between the VLE-match bit and the corresponding TCAM bitfield content and thus produce a rule-match output from the TCAM.

In the word-alternate search example above, the word-alternate expression is assumed to be disposed between two deterministic strings-a rule format that yields a three-phase search as follows: a first phase search within the TCAM for the initial string, a phase-two search for a matching word-alternate within the PCRE coprocessor block (and more specifically within the word-alternate block), and a phase-three search for the remaining string. In various embodiments herein, these segment-search phases are logically interconnected by transmission of a rule-segment ID (connecting the initial TCAM search phase to the subsequent phase-two search within the PCRE coprocessor) and by insertion of a VLE match bit into the TCAM comparand stream (connecting the phase-two PCRE coprocessor search to the subsequent and final phase-three TCAM search)—an approach that enables rule-match progression to be carried out incrementally without requiring centralized rule-tracking overhead.

Continuing with FIG. 4, example 207 illustrates a multiphase search sequence carried out with respect to a rule containing a regular-expression quantifier—an expression that indicates a variable number of instances of a character or character class. Assuming, for purposes of illustration that the quantifier is embedded between leading and trailing strings, and that a first phase search for the initial string within the RSB (i.e., TCAM component thereof) yields a match, then the TCAM will initiate a second-phase search for the quantified expression by issuing a rule-segment ID and match signal to the quantifier search block as shown. In a second-phase search, the quantifier block searches for the variable number of character/character-class instances, issuing a match signal and VLE-code to the comparand generator upon detecting, in order, (i) a parameterized minimum number of instances ("instance count") of the quantified expression (i.e., character/character-class) and (ii) either a parameterized maximum instance count or a mismatch between input character and quantified expression. As with the word-alternate match, the comparand generator responds to the quantifier-block match indication/VC-code by setting a VLE-match bit within the outgoing comparand at a location corresponding to a bitfield reserved within the TCAM for the quantified expression. By this action, a third-phase-search TCAM match between the trailing string (final rule segment) and input data stream will be accompanied by a match between the VLE-match bit and the corresponding TCAM bitfield content to yield a rule-match output from the TCAM.

The backreference search shown at 209 progresses in phases similar to those in the word-alternate and quantifier search examples, but involves additional rule segmentation and search phases to facilitate backreference capture—the recording of a rule-specified portion of the input data stream. Backreference capture is discussed in greater detail below, but assuming for present purposes that all rule segments that precede a backreference playback (generally a VLE) have been matched by input stream content, the TCAM will issue (upon matching rule segment that immediately precedes the backreference playback VLE) a rule-segment identifier and match confirmation to the backreference block (BKRB) as shown in the example at 209. The backreference block, in turn, executes a backreference search in which input stream content is compared with a previously recorded backreference (i.e., prior portion of the input stream), and issues a match signal and VLE-code to the comparand generator upon backreference-match confirmation. As with the word-alternate and quantifier VLE search operations, the comparand generator responds to the VC and match indication by setting a VLE-match bit within the outgoing comparand at a location corresponding to a bitfield reserved within the TCAM for the backreference expression. This action ensures that an ensuing TCAM match between a post-backreference string segment (e.g., a final rule segment) and input data stream will be accompanied by a match between the VLE-match bit and the corresponding TCAM bitfield content, thus enabling ongoing rule-segment search or yielding a TCAM rule-match output, depending on whether the post-backreference string segment is the final segment of the rule.

Still referring to FIG. 4, in the search example at 211, a VLE search for a lookahead or lookbehind regular expression (referred to herein collectively as a "lookaround") is executed similarly to other variable-length expression searches. Specifically, upon confirming a stream-content match with respect to a rule segment that immediately precedes the lookaround expression, the TCAM issues a rule-segment ID and match indication to the lookaround block, LKRB. In response, the lookaround block determines whether ensuing input stream content matches the string-ahead and one or more logical qualifier expressions (which collectively form the lookaround VLE), issuing a match signal and VLE-code to the comparand generator upon positive determination. As in prior VLE search operations, the comparand generator responds to the VC and match indication by setting a VLE-match bit within the outgoing comparand at a location corresponding to a bitfield reserved within the TCAM for the lookaround expression. As in other VLE searches, this bit-setting action ensures that an ensuing TCAM string-segment match will be accompanied by a match between the VLE-match bit and the corresponding TCAM bitfield content and thus a progression of the rule search to subsequent segments or, absent subsequent rule segments, issuance of a rule-match output.

Figure 5:
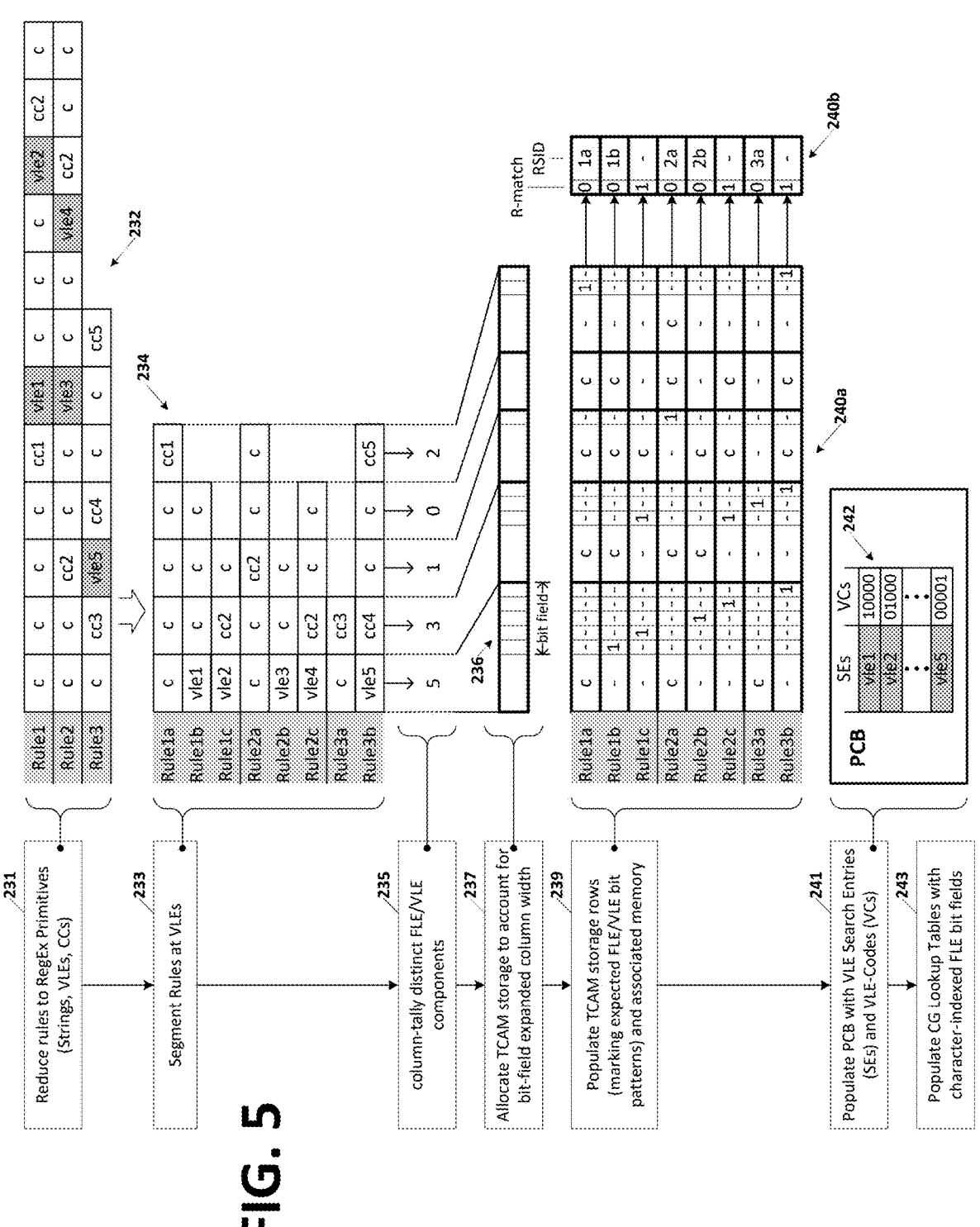
FIG. 5 illustrates an exemplary sequence of operations carried out by the rule parsing engine of FIG. 2 to segment rules and populate component search blocks within a rule search engine.

FIG. 5 illustrates an exemplary sequence of operations carried out by the rule parsing engine of FIG. 2 to segment rules and populate component search blocks within the rule search engine. Starting at 231, each rule within an exemplary three-rule set is reduced to a combination of regular-expression primitives—strings, variable-length PCRE elements (VLEs) and fixed-length PCRE elements, the latter being assumed in the present example to be limited to character classes (same-length word alternates may be present in other examples). Specific examples of rule reduction are discussed below in the context of RegEx quantifiers, but, for present purposes, the rule reduction is assumed to yield rules with strings, character classes and variable-length expressions as shown at 232.

At 233, the rule parsing engine segments the three rules at VLE boundaries to yield the multi-segment rule formats shown at 234. That is, rule 1 is split into three segments in accordance with the boundaries formed by VLE1 and VLE2. Rule 2 is similarly split into three segments (in view of the two constituent variable-length expressions VLE3 and VLE4), while single-VLE rule 3 is split into two rule segments at the VLE 5 boundary. Note that each rule segment includes a fixed-length expression (one or more characters and/or one or more character classes) optionally fronted by a variable-length expression so that all variable-length expressions in the rule-set are organized within the same rule component column.

At 235, the rule-parsing engine tallies distinct variable-expression rule components within each rule-component column to determine the formatting of TCAM character fields and bitfields-a determination at 237 that will also drive the format of the comparand generator output. For example, in the leftmost rule component column, the rule-set includes five distinct VLEs so that, assuming that each VLE match is signaled by a single bit (as discussed below, multiple bits may be allocated for backreference VLEs), a 5-bit VLE bitfield is appended to the leading TCAM character column as shown at 236. Proceeding from left to right with respect to the segmented rule set, the second rule component column includes four character-class references, three of which are distinct (i.e., there are two instances of "cc2"). Accordingly, a 3-bit variable-expression match field is appended to the second character column within the TCAM entry-format. The single character-class within the third rule component column ("cc2") is accommodated by a single variable-expression bitfield in the TCAM entry format, and the two character-class instances within the final rule component column of the segmented rule-set triggers allocation of a 2-bit field within the TCAM entry format.

Continuing with FIG. 5, at 239, TCAM storage rows are populated as shown at 240a, with expected VLE/VLE match events signaled by logic '1' values within bitfield columns corresponding to the VLEs themselves. Accordingly, in rule segment 1b (the second segment of rule 1), a logic '1' is stored within the leftmost column of the variable-expression bitfield to account for the VLE1 component of that rule. Thus, during a multi-phase search, a comparand match with rule segment 1b will require a logic '1' in the corresponding comparand location-a match indication that will or will not be present according to the search result for VLE1 carried out within the PCRE coprocessor block.

In addition to storing TCAM core content (i.e., loading search values into ternary CAM cells), rule-match and rule-segment identifier values corresponding to each TCAM row and thus respective rule segments are stored within an associated memory as shown at 240b (the associated memory being a constituent of the TCAM in one embodiment) so that row-specific match/RSID information is output from the TCAM in response to a rule-segment match event. Thus, in case of a match with rule-segment 1a, the logic '0' rule match value will suppress assertion of a rule-match signal while the "1a" RSID value (and a rule-segment match indication) are issued to the PCRE coprocessor block to trigger a search for VLE1. By contrast, a content match with rule-segment 1c (which will require a comparand bearing a positive VLE2 match bit as well as preceding matches with rule-segments 1a and 1b) will trigger a rule-match assertion at the TCAM output by virtue of the logic '1' rule-match value stored in association with that rule segment.

Still referring to FIG. 5, at 241 the rule parsing engine populates the PCRE coprocessor block ("PCB") with data and parameters corresponding to VLE rule components as well as VLE-codes to be issued upon VLE element match (e.g., as exemplified by the search entries and corresponding VLE codes shown at 242). At 243, the rule parsing engine finalizes the rule data/parameter distribution within the rule search engine by populating lookup tables within the comparand generator with character-indexed fixed-length element bit fields (e.g., bitfields corresponding to character classes). Both of these rule parsing/distribution actions are discussed in greater detail below in the context of search operations within specialized PCRE coprocessor block components and comparand lookup events within the comparand generator.

Figure 6:
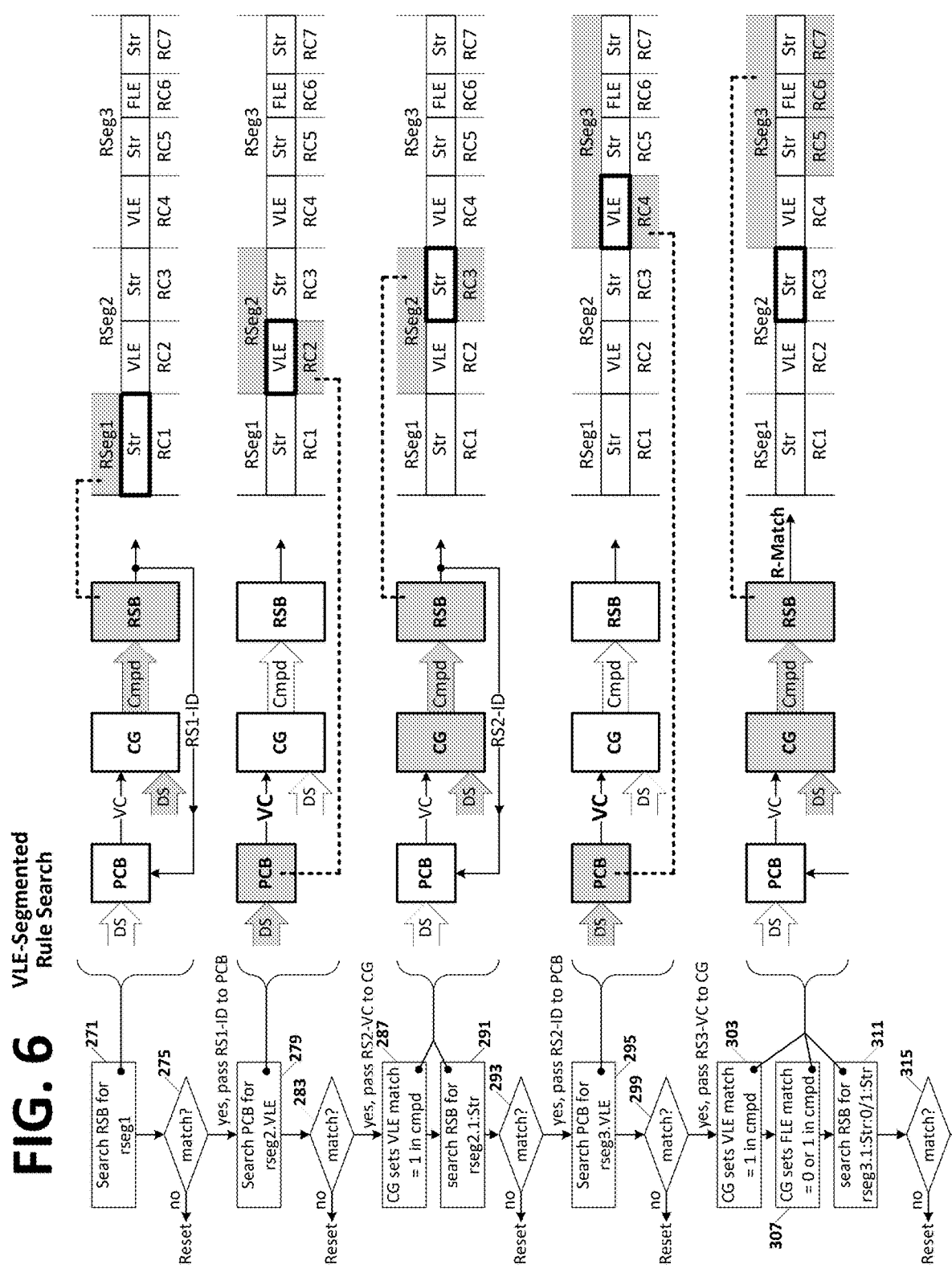
FIG. 6 illustrates an exemplary rule search sequence within the rule search engine of FIG. 2 with respect to a rule segmented at variable-length expression (VLE) boundaries.

FIG. 6 illustrates an exemplary rule search sequence within the rule search engine of FIG. 2 with respect to a VLE-segmented rule. As shown at 271, the rule in question is assumed to have seven distinct fragments organized within three rule segments. More specifically, a leading rule-segment (RSeg1) corresponds to a solitary string component (RC1), while the ensuing rule segment (RSeg2) includes both a variable-length element (RC2) and string component (RC3), and final rule segment (RSeg3) includes another variable-length element (RC4) followed by a string component (RC5), a fixed-length element (RC6) and another string component RC7.

Strings and bit-fields corresponding to individual rule segments are stored in respective TCAM rows within the RSB to render them independently searchable as described above in reference to FIG. 5. Accordingly, if an initial search within the RSB at 271 yields a match with respect to RSeg 1 (affirmative result at 275), the RSB will issue a match affirmation and rule-segment identifier (RS1-ID) to the PCRE coprocessor block (PCB) to trigger a search therein for the VLE corresponding to RC2 at 279. Upon confirming a match between the variable-length expression and content within the input data stream (affirmative at 283), the PCB issues a match signal and VLE code (VC) to the comparand generator. As shown at 287, the comparand generator responds to the PCB match/VC by setting a VLE match bit within the RSB-destined comparand to enable an RSB search for the next rule segment, RSeg2 at 291. That is, if the string component (RC3) of that rule segment matches content within the input data stream, then the matched VLE bits within the RSeg2 TCAM entry and comparand will yield an affirmative RSeg2 match result (293), and thus RSB issuance of RS2-ID to the PCRE coprocessor block to initiate search for the VLE corresponding to rule component RC4—the operation shown at 295. Upon confirming a match between the RSeg3 VLE and content within the input data stream (affirmative at 299), the PCB again issues a match signal and VLE code (VC) to the comparand generator. The comparand generator responds to the PCB match/VC by setting a VLE match bit within the RSB-destined comparand at 303 and also by setting or clearing a bit within the comparand corresponding to fixed-length expression (RC6) at 307 according to whether that expression is matched by incoming stream content (e.g., subject input stream character is member or not a member of character class). Thereafter the comparand value (containing the set VLE bit and the set or cleared FLE bit) is compared within RSB with rule components RC5 and RC7—the set VLE bit enabling an affirmative match result if the FLE comparand bit is set and the RC5/RC7 string values are present in the input data stream. This final-segment RSB search is shown at 311 and, if a match is detected (affirmative at 315), results in issuance of a rule-match signal to confirm detection of the malware signature.

Figure 7:
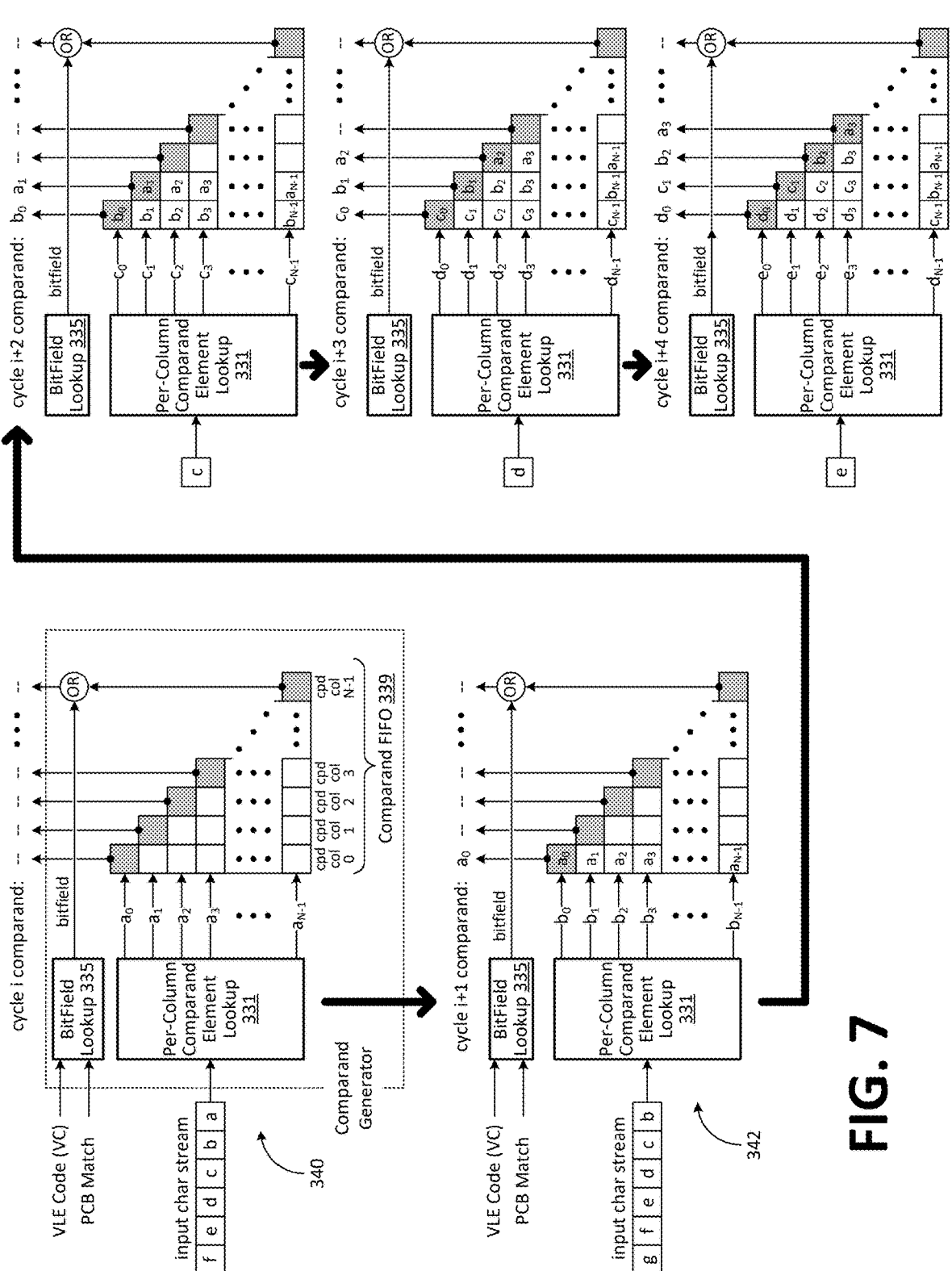
FIG. 7 illustrates an embodiment of comparand generator that operates in accordance with a multi-phase rule segment search approach.

FIG. 7 illustrates an embodiment of comparand generator that operates in accordance with the multi-phase rule segment search approach described above. As shown, characters within the input data stream are applied in sequential search cycles to a per-column comparand element lookup table 331, while VLE codes from the PCRE coprocessor block are supplied to a bitfield lookup table 335. In one implementation, the bitfield lookup table yields either a one-hot bit pattern according to the incoming VLE code, or a zero-valued bit pattern, depending on whether the PCB match signal indicates a PCB match. In either case, the resulting bitfield is logically ORed with the leading comparand column output of comparand FIFO 339 to produce the comparand element to be compared with the leading TCAM column—the TCAM column containing a bitfield with respective bit positions for all VLEs in the rule-set.

The per-column comparand element lookup table ("comparand lookup") generates, for each incoming character, a sequence of values that are to be compared with respective TCAM columns in successive search cycles—that is, a column-tailored set of comparand elements that are to be inserted one element per search cycle into each different column-specific comparand location. Viewing this progression in the context of a rule-set that yields varied column-element sizes in accordance with the number of FLE/VLE elements to be match-confirmed in each TCAM column means that individual column elements generated by the comparand lookup 331 will include different numbers of appended VLE/FLE match bits, in accordance with column widths defined for the rule-set being searched (see bitfield 236, of FIG. 5, for example). Accordingly, in response to queued input character 'a', comparand lookup retrieves a deterministic set of N comparand values each to be compared, in turn, to a respective column of the TCAM content. This is achieved, in the depicted embodiment, by including as each of the N comparand values output by comparand lookup, an instance of the input character ('a' in the lookup operation shown at 340) together with an optional bitfield in accordance with the size of the corresponding TCAM column content. Noting that the comparand FIFO shown in FIG. 7 assumes a left-to-right elemental propagation reverse that shown in FIG. 5, and taking the five-column TCAM rule-set storage shown at 236 in FIG. 5, for example, comparand element $a_4$ (which corresponds to generalized element $a_{N-1}$) will include an instance of character 'a' together with a five-bit bitfield (with all bits initialized to zero and eventually subject to logic OR with the VLE code output by lookup 331), while comparand element $a_3$ will include an 'a' together with a 3-bit bitfield (with one or more of those bits set according to whether 'a' is a member of the CC2, CC3 or CC4 character classes), and so forth. For TCAM columns having no VLE/FLE bit storage, the comparand element will be reflected by the input character alone.

Still referring to FIG. 7, at the conclusion of the character 'a' lookup during search cycle 'i', comparand FIFO will include elements as shown at 342, thus yielding the cycle i+1 comparand containing element $a_0$ as shown. During that search cycle, a comparand lookup on character 'b' will yield the b0-bN−1 comparand elements as shown, with those elements being inserted into the tail end of the comparand FIFO prior to the ensuing search cycle. Accordingly, during search cycle i+2, the comparand applied to the TCAM will include elements a1 and b0, while the lookup for input character 'c' yields c0-cN−1 comparand elements. Those elements are inserted into the comparand FIFO prior to the i+3 search cycle, thus yielding a comparand containing elements a2, b1, c0 and so forth, with cycle i+4 comparand containing elements d0, c1, b2, a3. In each case, a comparand reaching the Nth position within the FIFO buffer (corresponding to the leftmost TCAM position in the FIG. 5 example) will be ORed with a VC-indexed bitfield to yield a comparand element having VLE match bits set or cleared according to the output of the PCRE coprocessor block.

FIG. 8 illustrates an embodiment of a per-column comparand lookup table 361 that may be used to implement the comparand lookup 331 of FIG. 7. In the depicted implementation, lookup table 361 includes an input decoder 365 and a storage 367 loaded with a respective set of N comparand elements (according to rule-set column count) for each possible character in the input stream, including at least the alphanumerics shown (a-z, A-Z, 0-9, etc.). Thus, if a lower case 'z' is applied to input decoder, the decoder will assert the corresponding 'z' word-line to read-out the N comparand elements $z_0$-$Z_{N-1}$, effectively pushing those elements into the tail end of the comparand FIFO.

FIG. 9 illustrates a TCAM rule storage example that guides population of the FIG. 8 comparand lookup table—an example that assumes a eight rules (0-7) each spanning sixteen or fewer elemental columns. As shown, rules 0, 1, 3, 4 and 7 include character class references in rule column four (rc04), while rules 3, 5 and 7 include character class references in rule column rc09 and rule 2 alone includes a character class reference in rule column 15. Following the FLE/VLE tally operation discussed in reference to FIG. 5 (i.e., tallying the number of unique FLE/VLE expressions per comparand column), 5-bit, 3-bit and 1-bit FLE bitfields are allocated within the TCAM storage for rule columns 4, 9 and 15, respectively. Upon loading constituent characters of the rule into the TCAM, bits are set within each row according to a correspondence between individual bitfields and character classes—a correspondence that is carried forward when populating the per-column lookup table.

FIG. 10 illustrates an exemplary approach to populating the per-column lookup table of FIG. 8 that carries forward the rule-set example of FIG. 9 as well as the bitfield/character-class correspondence. In the depicted embodiment, the rule-parsing engine includes (or constructs) a character class membership table (CCMT) that includes all the character classes in the rule-set (which may be fewer than the total number of character classes in the membership table) and indicates, for each possible input character, the specific character classes that count that input character as a member (i.e., character classes to which the input character subscribes). Thus, membership table indicates that character 'a' is a member of character classes cc1, cc4, cc11 and cc21 (at least), character 'b' is a member of character classes cc1, cc4, cc5, cc12 and cc22, and so forth. Accordingly, by correlating the specific character classes associated with respective comparand-column bit fields to those same character classes in the membership table, a per-column lookup can be constructed with logic '1' values within the bitfields corresponding to subscribed character classes. Of the five character classes within rule-set column 4 (rc04), for example (i.e., cc2, cc4, cc5, cc11 and cc23), character 'a' is a member of only character classes cc4 and cc11. This membership is reflected in the per-column lookup table by zeroing the bitfields of the character-'a' column-4 comparand element for unsubscribed character classes cc2, cc5 and cc23, and setting a '1' in the bit locations for subscribed character classes cc4 an cc11. Accordingly, if a character 'a' is received within the input data stream during malware signature search, per-column lookup will output, for comparison with TCAM column 4, a comparand element containing the 'a' character together with the bit-pattern shown, thus ensuring a column-4 match with respect to rules 1 and 3 and a column-4 mismatch with respect to rules 0, 4 and 7.

FIG. 11 illustrates an exemplary approach to loading the per-column comparand element lookup table of FIG. 10, executed, for example, within the rule-parsing engine pursuant to comparand generator population. Starting at 421 for each rule-component column within the subject rule set, the rule parsing engine determines the number 'k' of distinct character classes, and allocating storage for k search bits "ccs" in a corresponding column of the comparand-element lookup table and creating a list "cc-list" of the distinct character classes. At 423, the rule parsing engine begins an outer loop for processing each possible input character ("ch"), followed by a first nested loop at 425 for processing each rule-component column ("rc"). Within the component-column loop, the rule parsing engine rule assigns the character to the character storage of the comparand element lookup table (CE LUT) at the character and component column index (i.e., CE LUT [ch, rc].char=ch) at 427. The rule parsing engine then begins a second nested loop (i.e., nested within the first nested loop) at 429 for each character class in the character-class list (i.e., cc_list[cc]), assigning the character class membership value for that character and character class (i.e., CCMT [ch, cc-list[cc]]) to the character class bitfield storage (at offset "cc") within the comparand lookup table at 431. Examples of the storage operations at 427 and 431 for ch='9', cc=4, and cc-list[cc]=cc23 and CCMT [ch, cc-list[cc]]=0 are shown at 415 and 417 of FIG. 10, respectively.

Figure 12A:
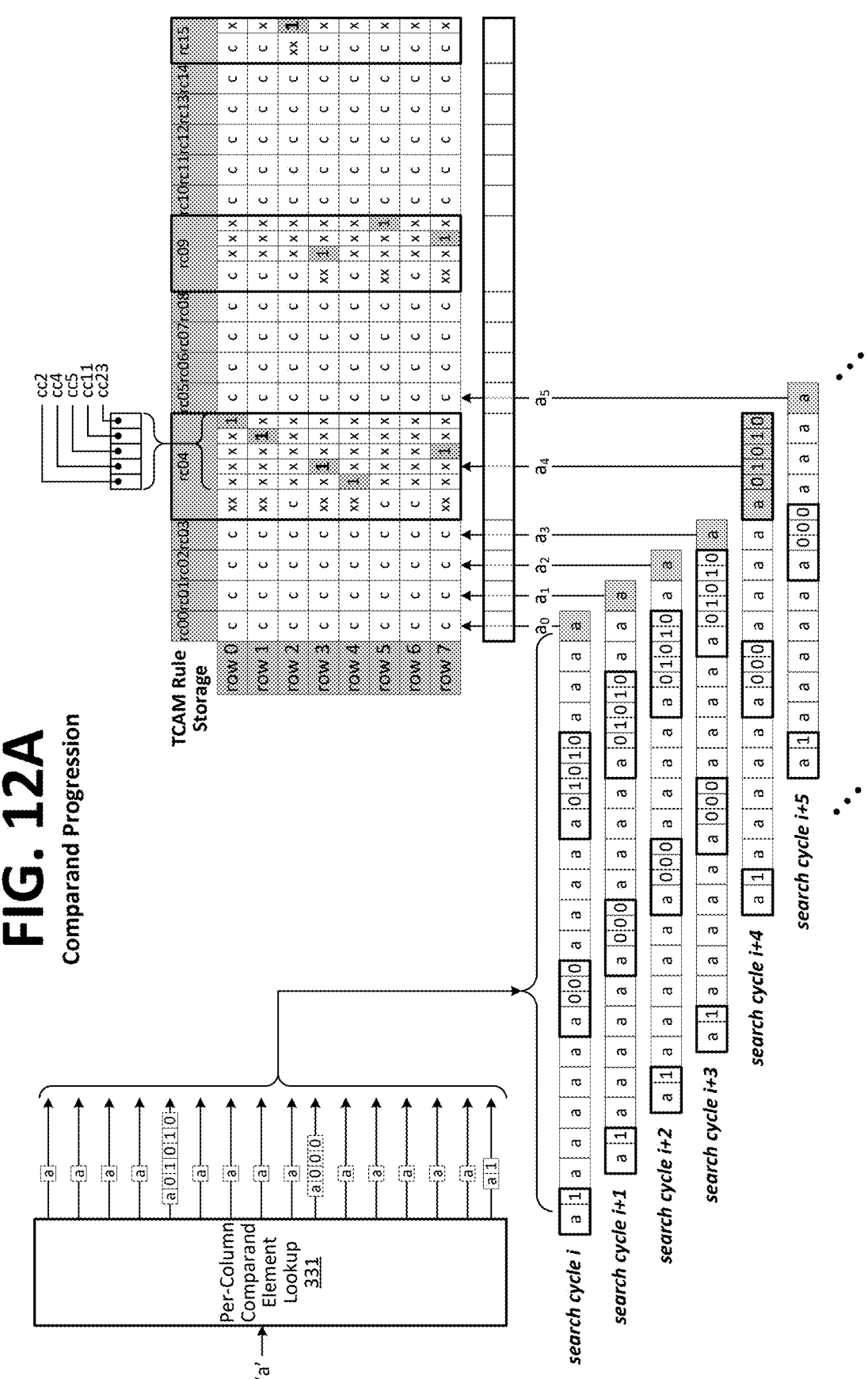
FIG. 12A illustrates an exemplary comparand progression.

FIG. 12A illustrates an exemplary comparand progression following reception of character 'a' in search cycle i–1 assuming, in this case, that the comparand progresses from left to right and that the TCAM is loaded with characters and bitfields as shown in FIG. 9. Note that comparand components from characters received prior to and after cycle i–1 are not shown—accordingly, the shaded character/bitfield depicted for each search cycle represents the character/bitfield transferred from the comparand FIFO to the TCAM comparand buffer in that search cycle, while the unshaded characters that follow reflect comparand FIFO contents to be applied to succeeding rule component columns of the TCAM in succeeding search cycles. Thus, during search cycle 'i' the FIFO buffer content in the leading FIFO element (e.g., the first of sixteen FIFO elements in this example) is transferred to the leading element of the TCAM comparand buffer and compared with contents of rule component column rc00. The TCAM compare generally occurs one cycle after comparand buffer loading so that the TCAM compare operation with respect to 100 may occur in search cycle i+1—an operation that corresponds to the a0 comparand compare shown for cycle i+1 in FIG. 7.

Continuing with FIG. 12A, search value 'a1' is loaded into the second comparand buffer position during cycle i+1 (while the previously loaded search value is compared with rc00), search value 'a2 is loaded into the third comparand buffer position during cycle i+2 and so forth, with the various search values and accompanying bitfields (if any) progressing toward the head of FIFO position (for their respective search cycle) during each step of the progression. Thus, during search cycle i+4, the character and bitfield corresponding to character 'a' is supplied to the corresponding column(s) of the TCAM comparand buffer, thereby effecting a comparison between the 'a' character and the character field within TCAM comparand column rc04 ('a' is compared with the character stored in TCAM rows 2, 5 and 6) and also a comparison of the bitfield looked up for 'a' (i.e., '01010') with the bitfields stored in respective bit positions of the rc04 bitfield. In this example, "xx" signifies a masked character field within the TCAM and 'x' signifies a masked bit position, so that the '01010' comparand bitfield applied to rc04 will match the corresponding bits at bitfield positions row1 and row3 (with bit positions being numbered sequentially from left to right, starting with bit position 0) of rows 1 and 3, thus yielding matches at least with respect to the rc04 components of those TCAM entries. In effect, the TCAM match with respect to rows 1 and 3, in rc04 bitfields positions 1 and 3 reflect the prior determination (i.e., through population of the character-class membership table) that character 'a' is indeed a member of the character classes "cc4" and "cc11" represented by those bit positions. Thereafter, the ensuing comparand values generated for character 'a' are transferred from the comparand FIFO to corresponding TCAM comparand buffer positions for comparison with ensuing rule-component columns within the TCAM, starting with transfer of 'a' (no bitfield) in search cycle i+5.

Figure 12B:
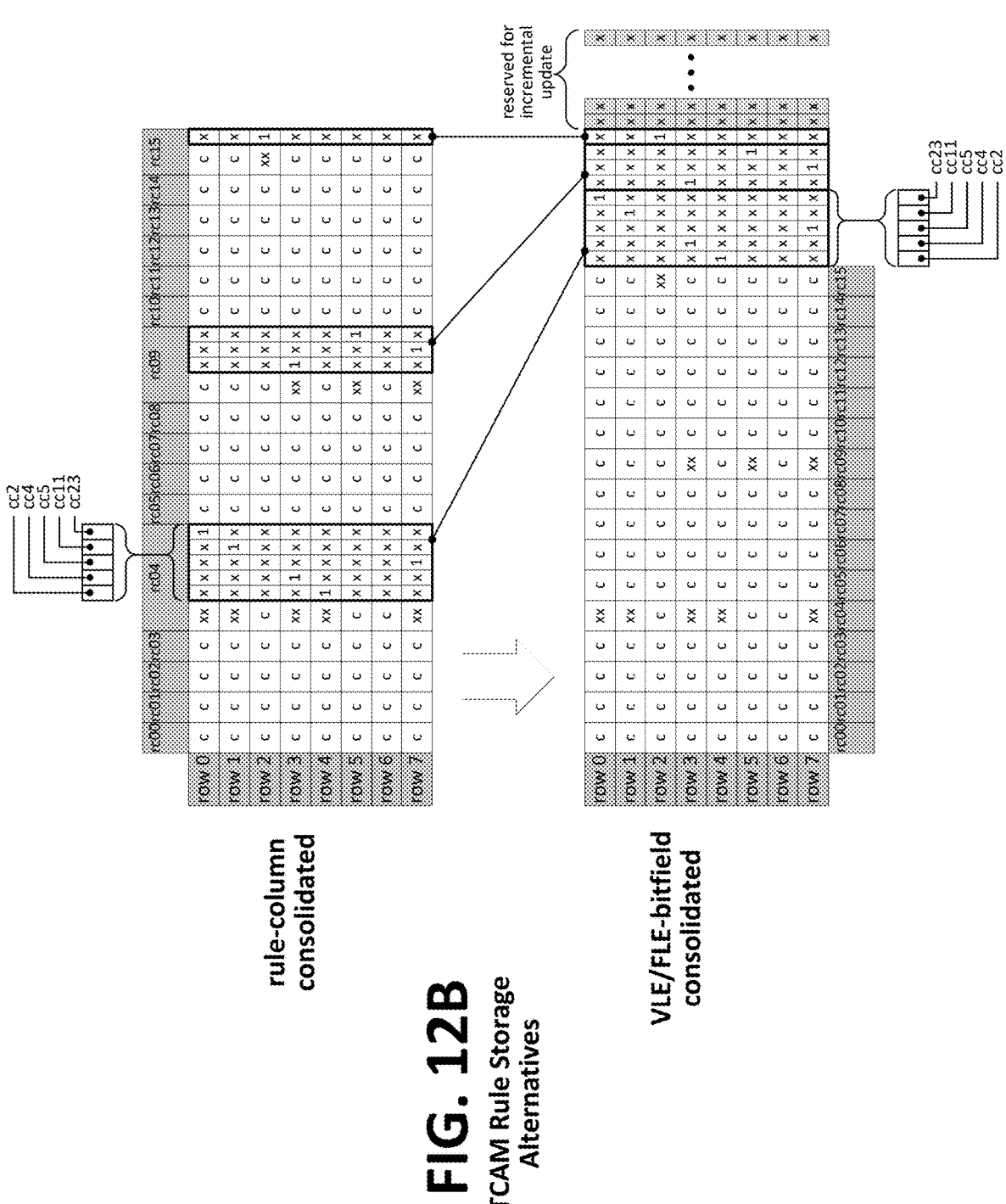
FIG. 12B illustrates an alternative TCAM storage arrangement in which bitfields corresponding to variable elements within rule set are relocated to the edge of the TCAM storage array.

FIG. 12B illustrates an alternative TCAM storage arrangement in which bitfields corresponding to VLEs and FLEs within rule set are relocated to the edge of the TCAM storage array. This arrangement simplifies incremental updates as VLE/FLE elements within rule-set updates (e.g., one or more rules being added to the rule set and/or modifications to rules within the rule set) may be allocated bitfield column(s) reserved for that purpose at the edge of the TCAM array (e.g., as opposed to having to substantially re-write the TCAM contents in order to insert one or more bitfields). While the bifield storage is shown at the far right edge of the TCAM array, the storage may be instead (or additionally) be allocated at the left edge of the TCAM array.

FIG. 13 illustrates a more detailed embodiment of a PCRE coprocessor block 500 that may be used to implement the PCRE coprocessor blocks shown in FIGS. 2 and 4. As generally discussed above, PCRE coprocessor block ("PCB") 500 includes a set of specialized search blocks dedicated to searching for respective types of PCRE elements. Thus, a word alternate block 501 is provided to search for word-alternates, a quantifier block 503 is provided to search for quantifiers, a backreference block 505 is provided to capture and search for back references and a lookaround block 507 is provided to search for lookahead and lookbehind references. Additional search blocks may be provided for alternative types of PCRE elements. Also, in actual implementation, data structures within one or more of the specialized search blocks (WAB, QNTB, BKRB, LKRB-shown generally at 509) may be leveraged within another of the search blocks, meaning that the boundaries between individual search blocks need not be absolute. Further, as generally discussed above, search for a particular PCRE element within any of the specialized search block is generally triggered by reception of a rule segment ID and a match signal from the rule search block (RSB). While the incoming RSID value and match signal is passed directly to all specialized search blocks in a number of embodiments, a control block 510 is provided to distribute those values in a more generalized embodiment, enabling selective enablement of individual blocks on demand and provision of PCRE-element-specific operational support. For example, in one embodiment, control block 510 performs a lookup with respect to each incoming RSID and match signal to determine the particular search block or blocks to which the RSID corresponds, and issuing enable signals exclusively to those search blocks. Control block 510 may also incorporate functional elements shared by two or more of the search blocks, such as a window counter that enables identification (by establishing a window of varying length) of specific content within the input data stream that is to be searched for a given word alternate, quantifier, backreference or lookaround expression. Further, in the depicted embodiment, control block 510 also receives backreference capture directives "BRefControl" from the RSB and responds to those directives by issuing control signals to the backreference block to commence and terminate backreference capture within one or more string buffers therein. Also, as shown, control block 510 may include a context memory 512 to support search-state storage and retrieval in response to flow-switch operations. In one implementation, for example, context memory is dual-ported (or implemented by two or more buffers) to permit concurrent/simultaneous storage of search-state data (counter values, partial match results, control values supplied from the RSB etc.) corresponding to signature search with respect to a first/current data flow and retrieval (and loading into specialized search blocks 509) of search-state data corresponding to a flow for which search-state was previously stored. Similar context storage may be provided with respect to the comparand generator and/or rule search block, thus permitting seamless and near-instantaneous context switching from flow to flow.

Figure 14:
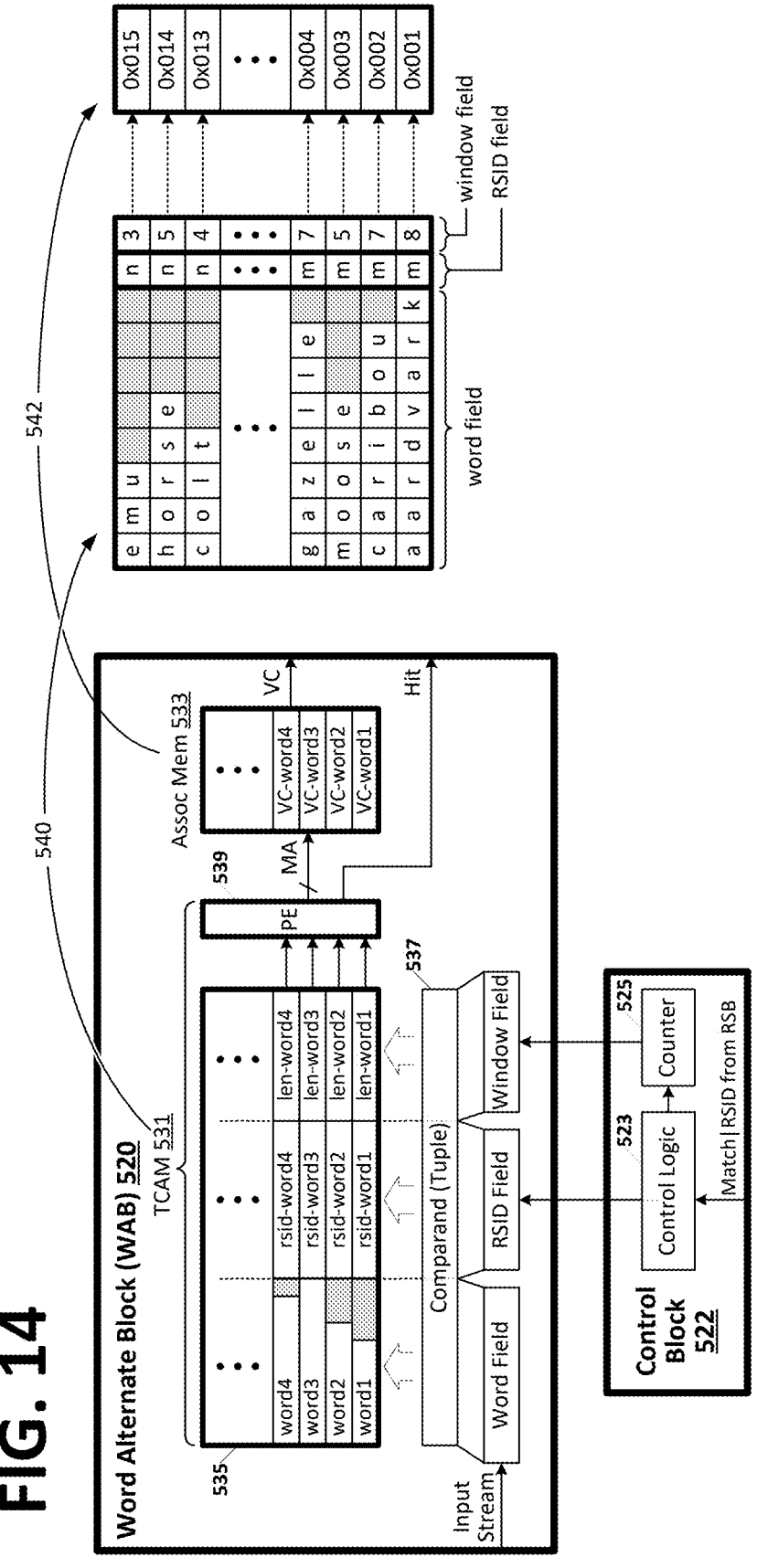
FIG. 14 illustrates an exemplary embodiment of a word alternate block and control block that may be used to implement a word alternate search in response to an incoming rule-segment identifier (RSID) and match signal from a rule-search block.

FIG. 14 illustrates an exemplary embodiment of a word alternate block 520 and control block 522 that may be used to implement a word alternate search in response to an incoming RSID and match signal from the rule-search block. In the particular embodiment shown, control block 522 includes control logic 523 and a counter 525 that respond to the match signal and RSID from the RSB by forwarding the RSID to word alternate block 520 (with or without translation/format-conversion) and commencing a character count operation within counter 525 at a time that corresponds to the first character in the input stream that is to appear within a word-alternate expression. As the counter output increases, the number of input stream characters selected for comparison with the set of alternate words expands, effectively widening a window into the input stream from which characters are selected for comparison.

Accordingly, the counter output is referred to herein as a window count that defines a "search window" in the input data stream.

In the FIG. 14 embodiment, word-alternate block 520 includes a ternary CAM 531 (TCAM) and associated memory 533, the latter of which may be incorporated into the TCAM in some implementations. TCAM 531 includes a comparand storage 535, comparand buffer 537 and priority encoder 539. As shown, the comparand storage is populated (e.g., by the rule parsing engine of FIG. 2) with a plurality of search values referred to herein as word-alternate tuples. More specifically, each word-alternate tuple includes a set of three fields: a word field that stores characters that constitute a given word within a word-alternate expression; an RSID field to store the identifier of the rule-segment that is to precede the word-alternate expression (e.g., value from the RSB) and a word-length value that indicates the applicable search window (number of input stream characters) the corresponding word-storage is to be compared with. Comparand buffer 537 is organized in this same three-part tuple, with characters in the incoming data stream being sequenced through the word field of the comparand tuple, while the RSID field and window fields of the comparand are populated by the RSID and window count from control block 522. Detail view 540 illustrates an exemplary population of the TCAM with two different word-alternates, including (i) a first word alternate containing three words ("emu" "horse" "colt") having window counts according to their string lengths (3, 5, 4) and to be searched in response to RSID value 'n', and (ii) a second word alternate expression containing four words ("gazelle" "moose" "caribou" "aardvark") having window counts as shown (7, 5, 7, 8) and to be searched in response to RSID value 'm'. Accordingly when control block 522 receives an RSID indicating that RSB has matched rule-segment 'n', the control block applies that RSID and an incrementing window count to the RSID and window fields, respectively, of comparand buffer 537. As input characters stream through the word field of the comparand buffer, the resulting comparand tuple is compared with the TCAM contents in a sequence of search operations that will yield a match signal in response to occurrence of "emu" "horse" or "colt" within the incoming data stream. Note that, because RSID 'n' is unique to the three-word word-alternate expression (i.e., emu, horse, colt), no other words within the TCAM will yield a match indication, regardless of input stream content.

Still referring to FIG. 14, priority encoder 539 is coupled to receive the row-match outputs from the TCAM word storage and, in response to assertion of a match signal conveyed therein (i.e., indicating a word-alternate match), asserts a TCAM hit signal (Hit) and a match-address (MA). The match address (which corresponds to the matched word|RSID|window within TCAM storage 535) is supplied in turn to associated memory 533 and is applied therein to lookup a VLE code (VC) corresponding to the matched word. In the example shown at 542 for instance, sequentially numbered VC values (which may include a component bit pattern/field specific to the word alternate block) are stored within the associated memory and output therefrom in response to a match with a corresponding one of the words (word1, word2, word3, word4, . . . ) within word-storage field of TCAM storage 535.

As discussed briefly above, rule-set reduction may be executed within rule parsing engine to reduce a variety of PCRE elements to an elemental set and thus reduce search-block complexity within the PCRE coprocessor block. This is particularly true in the case of quantifier expressions in which at least six quantifier variants may be eliminated through alternative representation with one of two elemental quantifier expressions in combination with an unquantified expression. In general, a PCRE quantifier expresses a variable number of instances of a quantified expression as "a{m, n}," with 'a' representing the quantified expression (generally a character or character class), 'm' representing the minimum number of expression instances required by the host rule, and 'n' representing the maximum number of instances. Variants of this generalized expression include at least the following:

| Expression | Equivalent General Expression |
|---|---|
| a? | a{0, 1} |
| a{m} | a{m, m} |
| a+ | a{1, ∞} |
| a* | a{0, ∞} |
| a{m, } | a{m, ∞} |
| a{, n} | a{0, n} |

Figure 15:
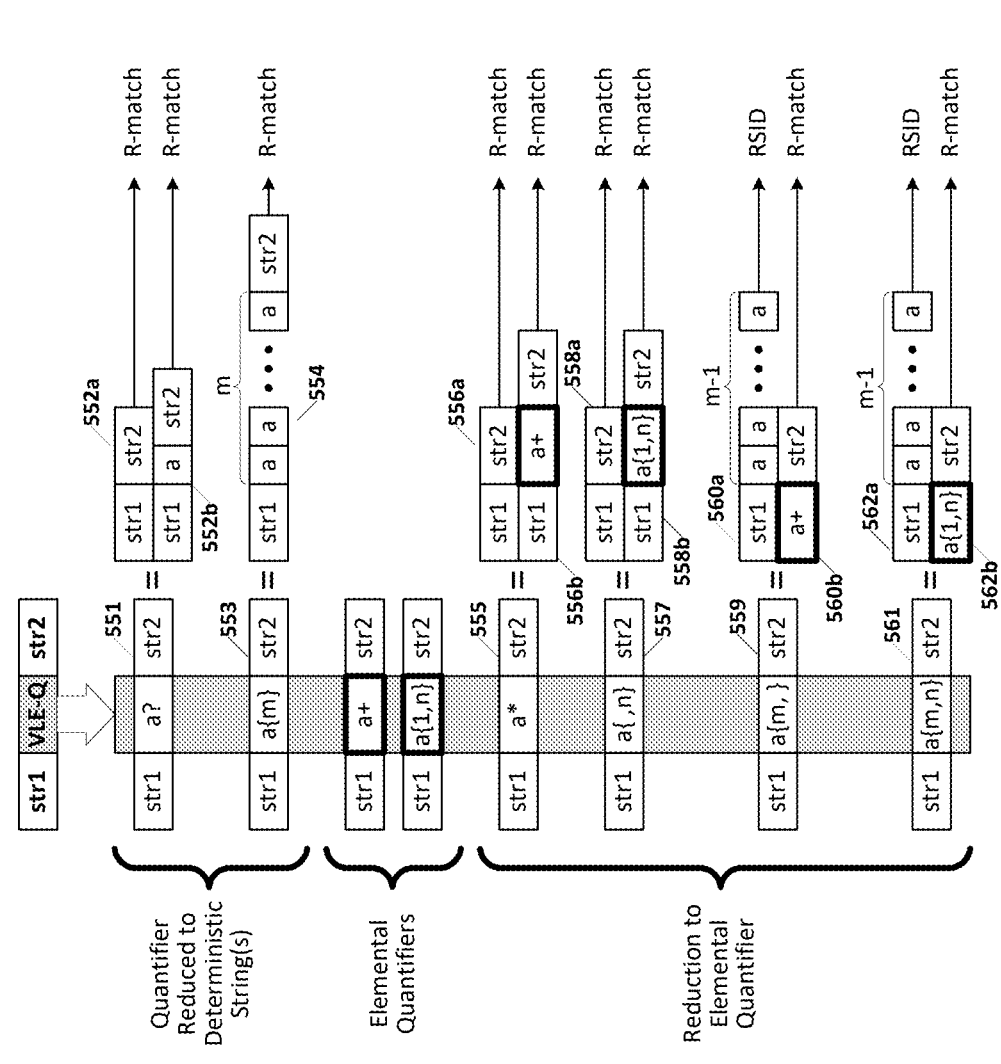
FIG. 15 illustrates an exemplary rule-set reduction executed by the rule parsing engine of FIG. 2 to reduce PCRE quantifier expressions to an elemental set of two quantifier expressions.

FIG. 15 illustrates an exemplary rule-set reduction executed by the rule parsing engine to reduce quantifier expressions to an elemental set of two expressions: a+ and a{1, n}—an approach that eliminates all zero-minimum quantifiers entirely, and limits the number of unbounded-maximum quantifiers to the "one or more" expression a+. More specifically, a rule 551 containing an "a?" quantifier expression is reduced by splitting the host rule into two resultant rules—a first rule 552a that lacks the quantified expression altogether and a second rule 552b that contains a single instance of the quantified expression. Note that this approach eliminates the quantifier altogether (i.e., each of resultant rules 552a, 552b constitutes a deterministic string) at the cost of an additional rule storage—generally an advantageous exchange in that each quantified expression that remains in the reduced rule set will otherwise require a storage entry in the quantifier search block (i.e., eliminated quantifier and need for entry in QNTB in exchange for additional entry in RSB).

Continuing with rule-set reduction examples, a rule 553 containing quantifier expression "a{m}" is effectively a deterministic string in any case, and thus may be replaced by a rule 554 containing the express number (m) of quantified expressions. A rule 555 containing quantified expression "a*" may be reduced to a pair of resultant rules 556a and 556b, the first lacking the quantified expression altogether (thus eliminating the zero-instance case) and the second containing elemental quantifier "a+". A rule 557 containing quantifier expression "a{, n}" may similarly be replaced by resultant rules 558a and 558b—the first lacking the quantified expression altogether (again eliminating the zero-bounded instance) and a rule containing elemental quantifier a{1, n}. A rule 559 containing quantified expression "a{m,}" may be replaced by rules 560a and 560b, with fixed-pattern rule 560a containing m−1 instances of the quantified expression, and rule 560b containing elemental quantifier "a+". Note that the m=1 case is identical to elemental quantifier a+, meaning that replacement rule 560a is unneeded in that instance. Finally, a rule 561 containing generalized quantifier expression "a{m, n}" may be replaced by rules 562a and 562b with fixed-pattern rule 562a containing m−1 instances of the quantified expression, and rule 562b containing elemental quantifier a{1, n}. Again, the m−1 case is identical to an elemental quantifier (i.e., a{1,n} in this instance), meaning that the replacement rule 562b is unneeded in such an instance.

Figures 16, 17, 18:
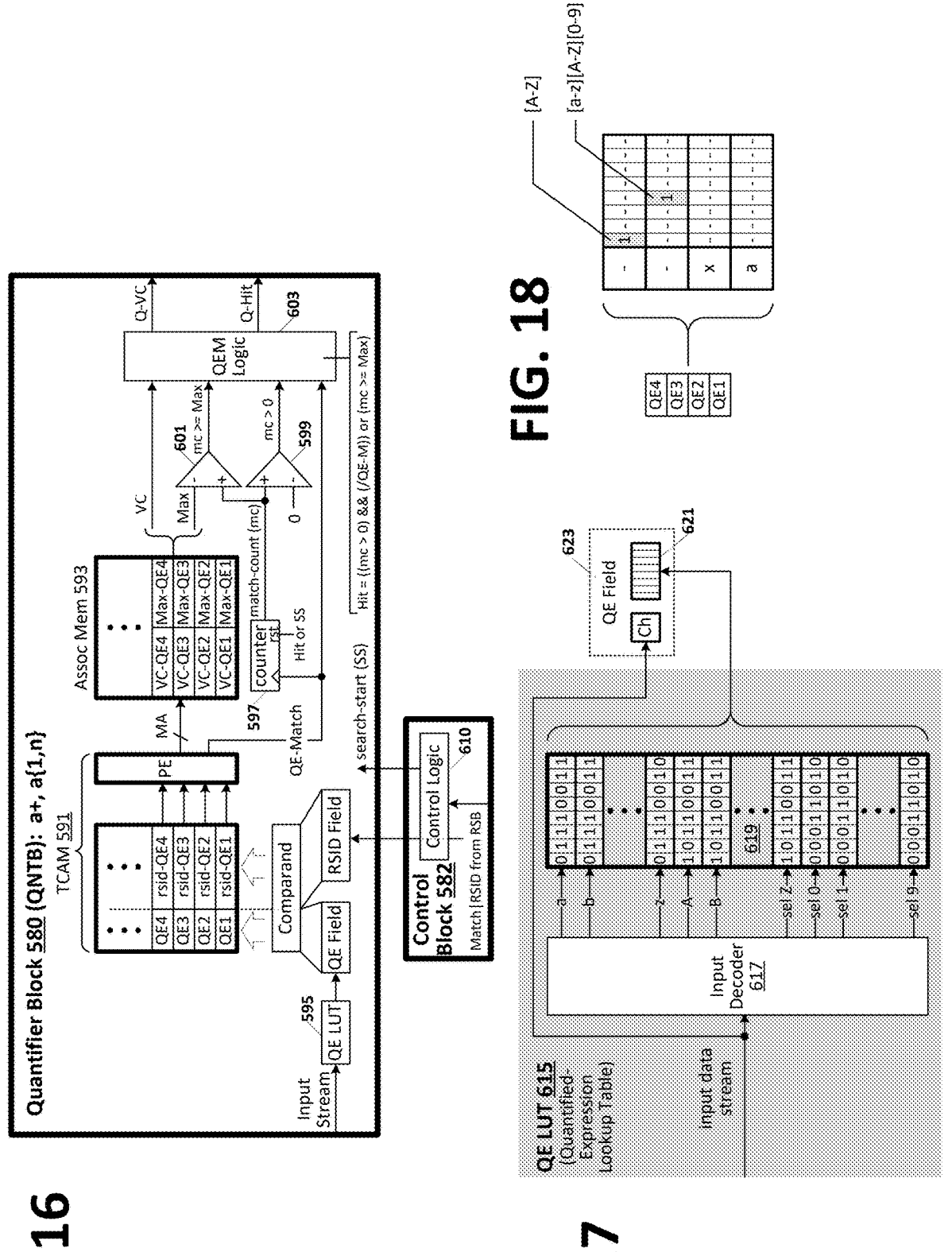
FIG. 16 illustrates an embodiment of a quantifier search block (QNTB) that may be used to implement the QNTB blocks shown in FIGS. 4 and 13.
FIG. 17 illustrates an embodiment of a quantified-expression lookup table 615 that may be used to implement quantified-expression lookup table of FIG. 16.
FIG. 18 illustrates an exemplary encoding of quantified expressions within the quantified expression field of the TCAM storage array.

FIG. 16 illustrates an embodiment of a quantifier search block 580 (QNTB) that may be used to implement the QNTB blocks shown in FIGS. 4 and 13 and that cooperates with control block 582 in accordance with the rule-set reduction to determine input stream matches with quantifiers a+ and a{1,n}. As shown, quantifier block 580 includes a ternary CAM 591, (having storage, comparand buffer and priority encoder), associated memory 593, quantified-expression lookup table 595, instance counter 597, comparators 599 and 601 and match logic 603. In general, the ternary CAM 591 searches for matches with respect to a two-part comparand value constituted by a quantified-expression (QE) and RSID tuple as shown. The quantified expression itself includes a tuple of a character and a bitfield which, as explained below, enables search for quantified instances of both characters and character classes. The RSID field within comparand buffer is populated by an RSID from control block 582 (e.g., from control logic 610 therein) and logically connects matches within ternary CAM 591 with prior matches within the RSB as discussed above. The priority encoder (PE) operates generally as discussed in reference to FIG. 14, outputting a QE-match signal in response to a row-match indication together with a match address (MA), the latter corresponding to a quantified expression and RSID tuple determined to match the comparand content. As shown, the match address is applied to associated memory 593 to look-up both a VLE code for the quantified-expression (QE) match, and a maximum count that corresponds to the maximum permissible number of instances of the quantified expression.

Still referring to FIG. 16, the QE-match signal is supplied to both instance counter 597 and match logic 603, with the former incrementing a match count (mc) to reflect the number of match instances with respect to the quantified expression. The match count is compared with a zero-valued lower-count-limit in comparator 599, which in turn asserts a greater-than-zero signal ("mc>0") so long as at least one instance of the quantified expression is encountered within the input data stream—thus enabling confirmation that "at least one" instance requirement of the relevant elemental quantifier ("a+" or "a{1,n}") is met.

The match count from instance counter 597 is additionally supplied to upper-limit comparator 601 for comparison with the maximum count (Max) retrieved from associated memory 593 in association with the matching quantified expression—a comparison that yields a max-count-reached signal (mc>=Max) when the max-count rises to the maximum specified ('n') in an "a{1,n}" elemental quantifier. In one embodiment, an unbounded maximum value that applies in elemental quantifier "a+" is represented a reserved "infinite-value" code within the max QE field of the associated memory—a Max value that will ensure a "not reached" determination when compared with the match count in upper-limit comparator 601.

In the embodiment of FIG. 16, match logic 603 receives the QE-match, greater-than-zero and maxed-count-reached signals, and includes combinatorial logic to assert a quantifier-hit (Q-Hit) signal if the match count is greater than zero (i.e., at least one instance of quantified expression found) and either (i) a mismatch with respect to the quantified expression has been detected ("/QE-M") or (ii) the maximum permissible instance count has been reached (i.e., max-count-reached signal assertion). The QEM logic additionally includes a register element (not specifically shown) to store the VLE code (VC) from the most recent QE match instance, together with selector logic to select, as the VC output of the quantifier block (Q-VC), either that register-stored VC or the VC output of the associated memory according to whether the quantifier hit resulted from a quantified-expression mismatch or detection that the maximum permissible match count was reached.

FIG. 17 illustrates an embodiment of a quantified-expression lookup table 615 that may be used to implement QE lookup table 595 of FIG. 16. As shown, QE lookup table 615 includes an input decoder 617 and a character-class table 619, and outputs, for each search cycle, a bitfield representation 621 of the character classes to which the input character (from the input data stream) subscribes. More specifically, input decoder 617 decodes each incoming character to assert a corresponding one of character-specific bitfield select lines, thereby enabling the bitfield (621) corresponding to that character to be output from lookup table 619. As shown at 623, the bitfield and input character collectively form the quantified expression that is loaded into the QE field of the TCAM comparand buffer.

FIG. 18 illustrates an exemplary encoding of quantified expressions within the quantified expression field of the TCAM storage array (i.e., within a rule search block). As shown, if the quantified expression is a character class, a bit corresponding to the character class is set within the membership bitfield and the character field of the entry (and) is masked (as are all other character-class bits within the membership bitfield). Thus, a bit corresponding to upper-case alphabet character-class [A-Z] is set in the TCAM entry for QE4, and a bit corresponding to alphanumeric character-class [a-z] [A-Z] [0-9] is set in the TCAM entry for QE3, with the character fields and all other membership bits within those entries being masked. By contrast, quantified expressions QE1 and QE2 are literal characters 'a' and 'x', respectively, so that all membership bits within the bitfields of those two entries are masked. As in the character-class lookup within the per-column lookup table of FIG. 8, correspondence between individual character classes and bit positions within the membership field storage (in both TCAM and QE lookup table) may be established by the rule parsing engine in accordance with the specific quantifiers included within a given set of rules or rule updates.

Figure 19:
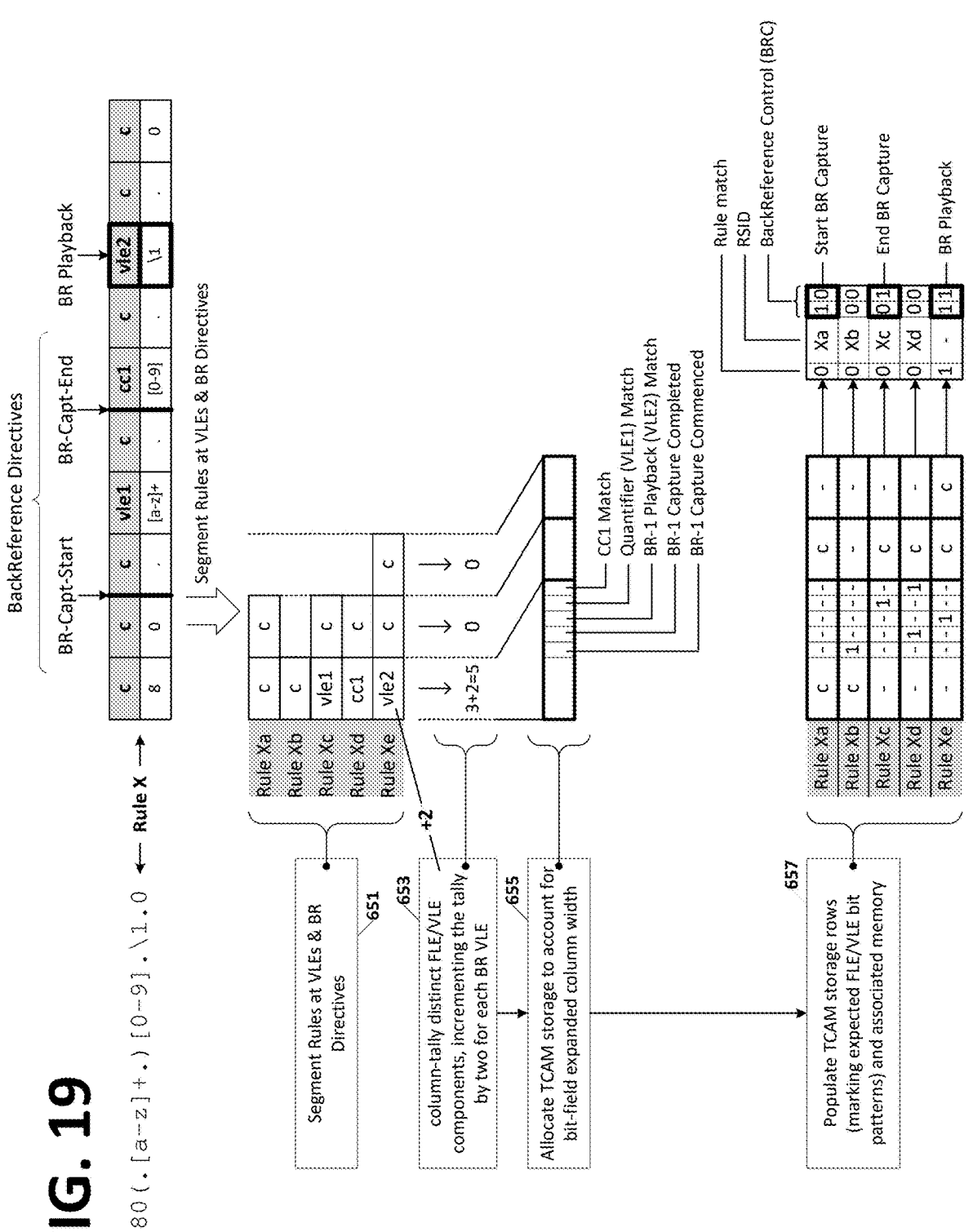
FIG. 19 illustrates an exemplary operation of the rule-parsing engine of FIG. 2 in response to upon encountering a backreference within a rule set or rule update.

FIG. 19 illustrates an exemplary operation of the rule-parsing engine of FIG. 2 in response to upon encountering a backreference within "Rule X" of set or rule update. As discussed above, a backreference is a (generally) variable-length expression in which a sequence of characters occurring within a particular field or window within the input data stream is to be recorded in a backreference capture operation and then compared with later arriving content within the input stream in a backreference playback operation. Thus, a backreference is generally defined by at least three rule elements: a start-capture directive '(' signifying that ensuing input stream characters are to be captured; an end-capture directive ')' signifying that the backreference capture is complete (no more input stream characters to be added to backreference); and a playback reference "\#" which expresses the later point within the input data stream at which the backreference is required in order for rule match ('#' being a numeric reference to the backreference such that "\1", "\2", . . . may be used to refer to different backreferences within the same rule). Note that a single back reference capture may be followed by more than one playback reference.

Turning to the Rule X example, after initial characters '8' and '0', the rule includes a start-capture backreference directive '(' followed by another literal character '.', a quantifier VLE1 ([a-z]+, meaning that an indeterminate number between 1 and infinity of lower case characters are to be received), and then another literal character '.' before an end-capture directive is encountered. Thus, the backreference could encompass an essentially infinite number of string combinations of various lengths, such as ".a." or ".aaaaaaaaaaaaaaa." or ".abidance." etc. Following the end-capture directive, the rule requires a character within the numeric-digit character class [0-9], followed by character '.' and then a backreference playback VLE2 (i.e., "/1"). The rule then concludes with two trailing characters '.' and '0'.

Expanding on the exemplary rule segmentation approach discussed in reference to FIG. 4, the rule parsing engine segments Rule X at both the VLEs and backreference directives at 651, thus enabling an RSB match indication (and corresponding RSID output) at each of those points in the rule. At 653, the individual columns are tallied to determine the number of distinct FLE/VLE components in each rule component column, in this case incrementing the tally by two for each back-reference VLE to provide an additional pair of bits (per backreference) to signify back-reference start-capture and end-capture events. In this case Rule X is evaluated in isolation so that a total of five bits are allocated within the TCAM storage to account for character-class CC1, quantifier VLE1 and back-reference VLE2 and the backreference capture-start and capture-end directives. In the more general case all rules within a rule-set/rule-update will be evaluated to determine the FLE/VLE bitfield size or number of bits to be added to an existing FLE/VLE bitfield. After defining the TCAM storage format at 655, TCAM storage rows are populated at 657 with expected FLE/VLE bit patterns being marked as shown. Associated memory is similarly populated to reflect the RSIDs of the five Rule-X segments, and also to incorporate backreference control bits that signify start-capture (10), end-capture (01) and playback (11) operations (i.e., a pair of bits omitted from the FIG. 4 discussion, but present in an embodiment that includes backreference expression searching in accordance with FIG. 19). After populating the TCAM and associated memory as shown, the rule parsing engine may populate the PCRE coprocessor block (and more specifically the back-reference block therein) with data and VLE codes to permit backreferenced match detection.

Figure 20:
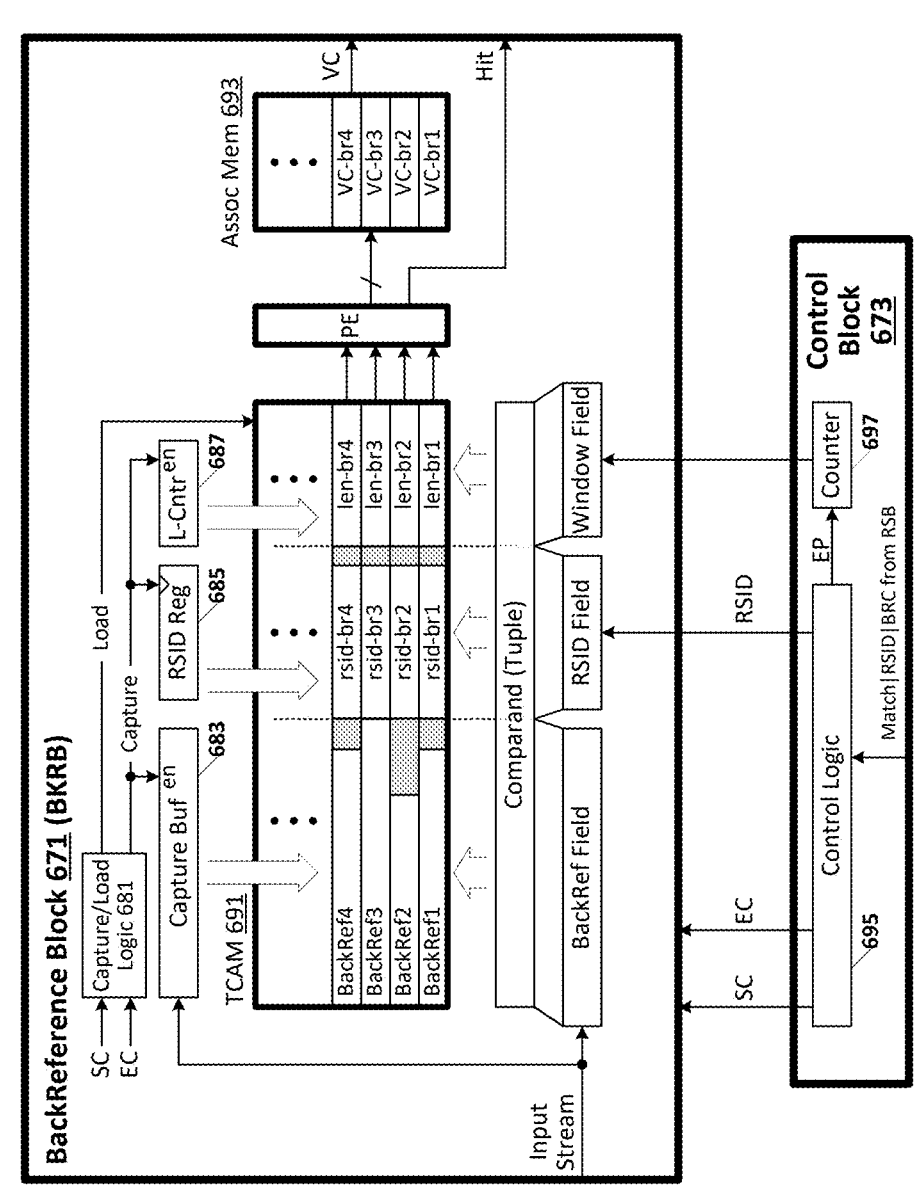
FIG. 20 illustrates an embodiment of a backreference block and control block that may be implemented within a PCRE coprocessor block (PCB) to implement backreference capture and playback operations in accordance with the rule parsing operations and TCAM/associated-memory population shown in FIG. 19.

FIG. 20 illustrates an embodiment of a backreference block 671 and control block 673 that may be implemented within a PCRE coprocessor block (PCB) to implement backreference capture and playback operations in accordance with the rule parsing operations and TCAM/associated-memory population shown in FIG. 19. As shown, control block 673 receives the match output, rule-segment ID (RSID), and back-reference control value (BRC) from the rule-search block (RSB) and issues, in response, a pair of capture control signals (start-capture, SC; end-capture, EC) and a playback-enable signal EP according to the BRC value. The capture control signals are supplied to a capture/load logic element 681 within backreference block 671, while the enable playback signal is supplied to an enable input of a window counter 697 (within control block 673) thus enabling delivery of an incrementing window count to the backreference control block during backreference playback (i.e., VLE search).

Backreference block 671 includes the aforementioned capture/load logic 681 together with a data-capture buffer 683, RSID register 685 and string-length counter 687. Backreference block 671 also includes a ternary CAM 691 (including CAM storage, comparand register and priority encoder) and associated memory 693. When a start-capture directive is received from the RSB (e.g., BRC='10' as in FIG. 19), control logic 695 asserts the start-capture signal (SC) and, in response, capture/load logic 681 asserts a backreference "capture" signal. As shown, the capture signal is supplied to respective enable inputs of capture buffer 683 and length-counter 687, enabling input data to be streamed into capture buffer 683 (character by character, as it is received) and corresponding incrementing of a "length-count" value within length counter 687. The capture signal is also applied to a strobe input of RSID register 685 to trigger storage therein of the RSID value from control block 695. By this operation, capture buffer 683 is incrementally filled with constituent characters of the backreference (i.e., loading from the input stream) while length counter 687 records/tracks the backreference size (string-length), and RSID register 685 holds the RSID of the rule segment that triggered the backreference capture.

When an end-capture directive is received from the RSB (e.g., BRC='01'), control logic 695 raises the end-capture signal; an event that causes capture-load/logic 681 to deassert the capture signal (ceasing data capture and length-incrementing operations) and to assert a load signal ("Load"). TCAM 691 responds to the load signal assertion by loading the captured backreference string, RSID value and length count (i.e., from buffer 683, register 685 and counter 687) into respective fields of the TCAM storage, thus storing a new backreference entry within TCAM 691 in preparation for later playback. In one embodiment, the backreference field within the TCAM is sized to hold the largest permissible backreference string, with unused storage cells (i.e., where actual backreference length is less than maximum) being masked as indicated by shading. Also the least significant bits of the RSID received from register 685 are masked in one implementation so that TCAM content comparison with a later-received RSID for the same rule (but corresponding to the rule-segment that precedes the playback rather than the backreference capture) will yield a rule-match—an approach that maintains the logical interconnection between rule segments (i.e., backreference within TCAM storage 691 from a given rule will only yield match when being compared with content containing an RSID from the same rule) despite minor difference between RSIDs received with backreference capture and playback directives.

Still referring to FIG. 20, when control block 673 receives a backreference control value (and accompanying RSID and match signal) from the RSB indicating a playback operation, control logic 695 asserts the enable-playback signal to enable window counting with counter 697. As shown the window counter output and the RSID field from control logic 695 supply the window and RSID fields, respectively, of the TCAM comparand buffer, while the backreference field is loaded with content from the input stream. Accordingly, TCAM 691 operates generally as described above in reference to the FIG. 15 word-alternate block, performing a three-tuple compare between the comparand contents and the TCAM storage. If the content of the comparand backreference field matches a backreference within the corresponding backreference field of the TCAM storage, and the length and RSID fields within the comparand also match their counterparts within the TCAM storage (with partial RSID-entry masking as discussed above), then TCAM will activate a match line for the corresponding storage entry. As in embodiments discussed above, the TCAM priority encoder (PE) responds to match line activation by asserting a match signal ("hit") and generating a match address, the latter indexing associated memory 693 to yield a VLE code output from the backreference match.

FIG. 21 illustrates a lookaround search block 720 that may be used to implement the lookaround blocks (LKRB) shown in the FIG. 2 and FIG. 4 PCRE control blocks. As briefly discussed above, lookaround expressions (positive/ negative lookahead and positive/negative look behind) are specially qualified match operations which involve (i) a determination whether a "string-ahead" expression (generally a nonzero/finite-length quantifier expression) is matched by content within the input data stream and (ii) whether that content match satisfies additional qualifications imposed by look-ahead or look-behind expressions. In the embodiment of FIG. 21, lookaround block 720 includes a character-class lookup table 721, string-ahead search block 723 and set of n lookahead search blocks $725_1$-$725_n$. Character-class lookup table 721 is implemented generally as discussed with respect to the quantified-expression lookup table shown in FIGS. 17 and 18 to deliver a search-expression stream ("SE Stream") to the string-ahead and lookahead search blocks—that is a sequence of characters with respective associated bitfields according to character class membership. String-ahead search block 723 determines whether a selected segment of the input character stream—referred to herein as the "search window"—matches the rule-specified string-ahead expression, while the lookahead search blocks ($725_1$-$725_n$, collectively "725") concurrently inspect the search window contents to resolve hit or miss with respect to respective lookahead expressions. As shown, control logic 731 within control block 730 issues an RSID value and search-start signal to lookaround block 720 in response to a matched RSB rule segment that precedes a lookaround VLE (i.e., as generally described above with respect to quantifier VLEs, backreference VLEs and word-alternate VLEs). Control logic 731 also issues a window count value and polarity signal to the lookaround block; the window count indicating the number of input characters received since search-start signal assertion (and thus defining the length of the character string searched at any given time), while the polarity signal indicates whether the lookaround is positive (i.e., affirmative lookahead result required for lookaround match) or negative (negative lookahead result required for lookaround match). In one embodiment, the polarity signal is recorded within the associated memory corresponding to the RSB entry that triggered the lookaround search—an approach similar to that described in reference to FIG. 19 for back-reference playback. In an alternative implementation, the polarity signal may be recorded within an associated memory within string-ahead search block or elsewhere within the PCRE coprocessor block.

Still referring to FIG. 21 and more specifically to the exemplary lookahead expression shown at 735, the string-ahead expression is generally expressed as a quantifier in the form a{m,n}, where 'a' constitutes the quantified expression, 'm' defines the minimum number of quantified expression matches required by the string ahead and 'n' defines the maximum size of the search window (i.e., field of characters to be searched within the input stream). Thus, if string-ahead search block 723 determines that fewer than 'm' successive instances of the quantified expression appear within the input stream (following search start), the string-ahead search block will deassert the lookaround hit signal (LA-Hit) to indicate that the lookaround is not present in the input stream. By contrast, if string-ahead search block 723 detects at least 'm' successive instances of the quantified expression, the string-ahead is deemed met, with the search window applied within the lookahead search blocks being set to a value between 'm' and 'n' according to the number of successive input characters determined to match the string ahead. Thus in the "w{6,10}" string-ahead example at 735, if at least six word characters are found in succession within the input stream following search-start, then the string-ahead is deemed to be matched, with the search window applied within the string-ahead search blocks being between 6 and 10 characters, according to location of a non-word character (if any) within character positions 7, 8, 9 or 10 after search-start. Assuming, for example, a non-word character in the $9^{th}$ position of the input data stream following search-start, then lookahead search blocks will yield affirmative or negative search results according to whether corresponding lookahead expressions are matched by the eight input stream characters that follow search-start.

In general, each lookahead expression (which may appear in variable number according to the lookaround expression) identifies a number of instances ("instance count") of a character or character class required within the search window in order to affirm a lookahead match. Thus, the leftmost (first) lookahead expression in example 735 (i.e., the expression searched in lookahead search block 725$_1$ requires at least three instances of character class [A-Z] (i.e., at least three capital letters) within the search window, while the rightmost (second) lookahead expression in example 735 (searched in search block 725$_2$) requires at least one instance of character class [\d] (i.e., at least one digit) within the search window. Hit/miss signals from respective lookahead search blocks (i.e., "instanced-expression" hit and thus IE Hit, IE$_2$Hit, etc.) are supplied to string-ahead search block 723 which combines the lookahead hit/miss with the string-ahead hit/miss to resolve an overall lookaround hit/miss signal, LA-Hit.

FIG. 22 illustrates an embodiment of a string-ahead search block 740 that may be deployed as the string-ahead search block in FIG. 21 and that implements a quantifier similar to that shown in FIG. 16, except that the lower quantifier bound 'm' may be greater than one. Accordingly, a ternary CAM 741 executes a parallel search with respect to a comparand formed by a tuple of an RSID field (from RSB) and search-expression field (from character-class lookup table), asserting a string-ahead match signal (SA-Match) and match address (MA) in response to an affirmative match. As in the FIG. 16 quantifier, a counter 745 is incremented by each successive match and thus yields a match count (mc) that may be compared with minimum and maximum quantifier bounds within comparators 747 and 749 to produce, within SA match logic 751, a string-ahead hit/miss signal (SA_Hit). In the embodiment shown, for example, SA match logic 751 asserts SA-Hit in response to an output from comparator 747 indicating that the match count has incremented to a value greater than or equal to the minimum bound (i.e., the minimum lookahead search window value, Min$_{LA}$ indexed within associated memory 743 in response to a given string-ahead match within TCAM 741) followed by detection of a string-ahead mismatch (i.e., "(mc>=Min) && (/SA–M)), or in response to an output from comparator 749 that the match count has incremented to the maximum bound (i.e., mc>=Max). Note that, while not specifically shown, logic may be provided to ensure that successive SA-match signal assertions from TCAM 741 resulted from the same RSID match (similar logic may be provided with respect to the QE-Match signal within the FIG. 16 quantifier).

Still referring to FIG. 22, the SA-Hit signal is output from the string-ahead search block to the lookahead search blocks (a detail not specifically shown in FIG. 21), and also to lookahead match logic 753. The lookahead match logic 753 responds to SA-Hit assertion by generating a lookaround hit signal according to the polarity signal (e.g., supplied by control block as discussed in reference to FIG. 21 or from associated memory 743) and IE-Hit signals from the lookaround search blocks. In one embodiment, for example, LA-match logic 753 generates LA-Hit according to the following Boolean expression: LA-Hit=SA-Hit && (Polarity xor IE$_1$Hit) && (Polarity xor IE$_2$Hit) && . . . && (Polarity xor IE$_n$Hit), where '&&' denotes logic AND 'xor' denotes exclusive OR.

FIG. 23 illustrates an embodiment of a lookahead search block 770 that may be used to implement lookahead search block 725$_1$ of FIG. 21 (with search blocks 725$_2$-725$_n$ being similarly implemented but loaded with content for different lookahead expressions). As shown lookahead search block 770 includes a TCAM 771, associated memory 773, instance counter 775, comparator 777, and result latch 779. TCAM 771 operates generally as discussed in reference to FIG. 22 to signal hit or miss with respect to character or character-class instances for respective lookaround expressions, with each affirmative result (hit) yielding an "instant detect" signal that increments instance counter 775 and a match address (MA) that indexes into associated memory 773 to retrieve the minimum instance count recorded for detected expression. Note that the individual instanced expressions recorded within TCAM 771 (i.e., character or character class whose instances are to be counted within a search window established by the string ahead) are doubly indexed in view of the fact that there may be multiple lookaround expressions in a given rule set and each lookaround may include multiple lookahead expressions—thus IE$_1$4 refers to the first of possibly many IE values within lookaround LA4. Expression IE$_2$4, if present, would be stored within the TCAM for lookahead search block 2, and so forth. Also, though not specifically shown, logic may be provided to ensure that only repeated instances of the same instanced expression are counted within counter 775.

Still referring to FIG. 23, the indexed minimum instance count (IE$_1$Min) and the instance-count (ic) from counter 775 are compared within comparator 777 to yield a comparison result (ic>=Min) that is latched within result latch 779 in response to assertion of the SA-Hit signal by the string-ahead search block. Accordingly, upon determination that the string ahead has been matched and search window closed, hit/miss signals are latched within each of the lookahead search blocks (e.g., with results from unused lookahead search blocks for a given lookaround expression being masked) and supplied to the string-ahead search block to yield an overall lookaround hit/miss result for the lookaround expression (i.e., "LA-Hit"). In the case of a lookaround match, a VLE code (VC-LAn) is output from the lookaround block (e.g., from associated memory 743 of the string-ahead search block shown in FIG. 22) to enable generation of a comparand bit pattern having a set bit in a column corresponding to the lookaround element within the rule corresponding to the RSID.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

Any of the various methodologies disclosed herein and/or user interfaces for configuring and managing same may be implemented by dedicated hardware and/or machine execution of one or more sequences of instructions (including related data necessary for proper instruction execution). Such instructions may be recorded on one or more computer-readable media for later retrieval and execution within one or more processors of a special purpose or general purpose computer system or consumer electronic device or appliance, such as the system, device or appliance described in reference to FIG. 1. Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, the term "engine" or "logic engine" as used herein refers broadly to one or more components implemented by dedicated hardware, programmed processor(s), or any combination of dedicated hardware and programmed processor(s). Any of the specific memory or storage sizes, signal path widths, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures.

Device or component "programming" can include, for example and without limitation, loading a control value into a register or other storage circuit within the device or component in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device or component. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A malware detection engine implemented within an integrated circuit component, the malware detection engine comprising:

a rule search block having circuitry to store a plurality of entries and to compare, at respective times, first and second compare values with the plurality of entries, the plurality of entries including first and second entries that correspond to first and second parts of a malware signature, and the first compare value including first characters in a network traffic flow;

a coprocessor to generate, in response to an output from the rule search block indicating that the first compare value matches the first entry, an expression-match value that indicates whether second characters in the network traffic flow match a variable expression within the second part of the malware signature; and a compare value generator having circuitry to generate, as the second compare value, a concatenation of third characters in the network traffic flow and the expression-match value.

2. The malware detection engine of claim 1 wherein the rule search block comprises circuitry to assert a malware-detect signal to indicate that the malware signature has been detected within the network traffic flow if the rule search block determines that at least the first and second compare values match the first and second entries of the plurality of entries, respectively, and to deassert the malware-detect signal if the first compare value does not match the first entry or the second compare value does not match the second entry.

3. The malware detection engine of claim 1 wherein the coprocessor to generate the expression-match value comprises circuitry to generate, as the expression-match value, one or more bits in a predetermined state to indicate whether the second characters in the network traffic flow match the variable expression.

4. The malware detection engine of claim 1 wherein the circuitry to store the plurality of entries and to compare, at respective times, first and second compare values with the plurality of entries the rule search block comprises a content addressable memory to store the plurality of entries and to compare the first compare value simultaneously with each of the plurality of entries during a first interval and to subsequently compare the second compare value simultaneously with each of the plurality of entries during a second interval.

5. The malware detection engine of claim 1 wherein the coprocessor to generate the expression-match value comprises circuitry to generate the expression-match value during a third interval that transpires after the first interval and prior to the second interval.

6. The malware detection engine of claim 1 wherein the second characters in the network traffic flow comprise a sequence of N characters, and wherein the coprocessor to generate the expression-match value that indicates whether the second characters match the variable expression comprises circuitry to determine whether the sequence of N characters matches any one of a plurality of alternate sequences of N characters specified by the variable expression, N being an integer greater than one.

7. The malware detection engine of claim 1 wherein the coprocessor to generate the expression-match value that indicates whether the second characters match the variable expression comprises circuitry to generate a count of contiguous instances of a predetermined character within the second characters and to determine whether the count of contiguous instances falls within a quantity of contiguous instances specified by the variable expression.

8. The malware detection engine of claim 7 wherein the circuitry to determine whether the count of contiguous instances of the predetermined character falls within the quantity of contiguous instances specified by the variable expression comprises circuitry to determine whether the quantity of contiguous instances of the predetermined character falls between upper and lower bounds specified by the variable expression.

9. The malware detection engine of claim 1 wherein the coprocessor comprises circuitry to record a first sequence of characters within the network traffic flow that precedes the first, second and third characters, and wherein the coprocessor to generate the expression-match value that indicates whether the second characters match the variable expression comprises circuitry to determine whether the second characters include a repeated instance of the first sequence of characters.

10. The malware detection engine of claim 1 wherein the rule search block having the circuitry to store the plurality of entries and to compare the first and second compare values with the plurality of entries comprises circuitry to output search criteria to the coprocessor in response to detecting a match with respect to a first compare value, the search criteria specifying, as the variable expression within the second part of the malware signature, one of a plurality of types of variable expressions.

11. A method of operation within an integrated-circuit malware detection engine having a rule search block, coprocessor and compare value generator, the method comprising:

receiving a network traffic flow that includes first characters, second characters and third characters;

comparing, via circuitry within the rule search block, a first compare value that includes the first characters with a plurality of entries stored within the rule search block, the plurality of entries including first and second entries that correspond to first and second parts of a malware signature;

generating, within the coprocessor in response to an output from the rule search block indicating that the first compare value matches the first entry, an expression-match value that indicates whether the second characters match a variable expression within the second part of the malware signature;

generating, via circuitry within the compare value generator and as a second compare value, a concatenation of the third characters in the network traffic flow and the expression-match value; and comparing the second compare value with the plurality of entries stored within the rule search block.

12. The method of claim 11 further comprising asserting a malware-detect signal to indicate that the malware signature has been detected within the network traffic flow if the at least the first and second compare values match the first and second entries of the plurality of entries, respectively, and deasserting the malware-detect signal if the first compare value does not match the first entry or the second compare value does not match the second entry.

13. The method of claim 11 wherein generating the expression-match value comprises outputting to the compare value generator, as the expression-match value, one or more bits in a predetermined state to indicate whether the second characters in the network traffic flow match the variable expression.

14. The method of claim 11 wherein the rule search block comprises a content addressable memory to store the plurality of entries, and wherein comparing the first and second compare values with the plurality of entries stored within the rule search block comprises:

executing a first compare operation within the content addressable memory to compare the first compare value simultaneously with each of the plurality of entries; and after executing the first compare operation, executing a second compare operation within the content addressable memory to compare the second compare value simultaneously with each of the plurality of entries.

15. The method of claim 11 wherein generating the expression-match value comprises generating the expression-match value after executing the first compare operation and before executing the second compare operation.

16. The method of claim 11 wherein the second characters in the network traffic flow comprise a sequence of N characters, and wherein generating the expression-match value that indicates whether the second characters match the variable expression comprises determining whether the sequence of N characters matches any one of a plurality of alternate sequences of N characters specified by the variable expression, N being an integer greater than one.

17. The method of claim 11 wherein generating the expression-match value that indicates whether the second characters match the variable expression comprises generating a count of contiguous instances of a predetermined character within the second characters and determining whether the count of contiguous instances falls within a quantity of contiguous instances specified by the variable expression.

18. The method of claim 17 wherein determining whether the count of contiguous instances of the predetermined character falls within the quantity of contiguous instances specified by the variable expression comprises determining whether the quantity of contiguous instances of the predetermined character falls between upper and lower bounds specified by the variable expression.

19. The method of claim 11 wherein receiving the network traffic flow comprises receiving a first sequence of characters that precedes the first, second and third characters within the network traffic flow, and wherein generating the expression-match value that indicates whether the second characters match the variable expression comprises recording the first sequence of characters and determining whether the second characters include a repeated instance of the first sequence of characters.

20. The method of claim 11 further comprising outputting from the rule search block, in response to detecting a match between the first compare value and the first entry, search criteria that specifies, as the variable expression within the second part of the malware signature, one of a plurality of types of variable expressions, and wherein generating the expression-match value comprises generating, as the expression-match value, a value that indicates whether the second characters match the one of the plurality of types of variable expressions specified by the search criteria.

\* \* \* \* \*